United States Patent
Hurst et al.

(10) Patent No.: US 12,188,570 B2
(45) Date of Patent: Jan. 7, 2025

(54) OPTIMAL-CONTACT SUCTION VALVE ASSEMBLY GUIDE

(71) Applicant: Halliburton Energy Services, Inc., Houston, TX (US)

(72) Inventors: Justin Lee Hurst, Duncan, OK (US); Timothy Holiman Hunter, Duncan, OK (US); Frank Kresse, Duncan, OK (US); James A. Olis, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 18/206,171

(22) Filed: Jun. 6, 2023

(65) Prior Publication Data
US 2024/0410488 A1 Dec. 12, 2024

(51) Int. Cl.
| | |
|---|---|
| *F16K 27/08* | (2006.01) |
| *E21B 43/12* | (2006.01) |
| *F04B 19/04* | (2006.01) |
| *F04B 53/10* | (2006.01) |

(52) U.S. Cl.
CPC ............ *F16K 27/08* (2013.01); *E21B 43/12* (2013.01); *F04B 19/04* (2013.01); *F04B 53/10* (2013.01)

(58) Field of Classification Search
CPC .......... E21B 43/12; F04B 19/04; F04B 53/10; F04B 47/00; F04B 53/12; Y10T 137/792
USPC .......... 166/305.1; 417/545, 904; 137/533.19
See application file for complete search history.

(56) References Cited

U.S. PATENT DOCUMENTS

| | | | |
|---|---|---|---|
| 6,910,871 B1 | 6/2005 | Blume | |
| 10,876,775 B2 | 12/2020 | Danielson et al. | |
| 11,041,570 B1* | 6/2021 | Buckley | F16K 15/023 |
| 11,105,327 B2 | 8/2021 | Hurst et al. | |
| 11,384,756 B1 | 7/2022 | Smith | |
| 2021/0190211 A1* | 6/2021 | Gillispie | F04B 15/02 |
| 2022/0268362 A1* | 8/2022 | Skurdalsvold | F16K 1/385 |
| 2023/0383743 A1* | 11/2023 | Brock | F04B 53/1087 |

* cited by examiner

Primary Examiner — Matthew Troutman
Assistant Examiner — Patrick F Lambe
(74) Attorney, Agent, or Firm — Conley Rose, P.C.; Rodney B. Carroll

(57) ABSTRACT

A valve guide includes a valve guide body having a valve guide bore along a central axis thereof. In an assembled configuration of a horizontal valve assembly comprising the valve guide, a valve stem passes through the valve guide bore, connecting a valve body to the valve guide. The valve guide further includes first and second skis that each extends radially outward from the valve guide body to a lower wing outer surface, such that the lower wing outer surface is a first radial distance from the valve guide bore central axis; and an upper wing extending radially outward from the valve guide body to an upper wing outer surface. The upper wing outer surface is a second radial distance from the valve guide bore central axis. The first radial distance is greater than an interior radius of a housing bore the horizontal valve assembly is positioned in for use.

16 Claims, 10 Drawing Sheets

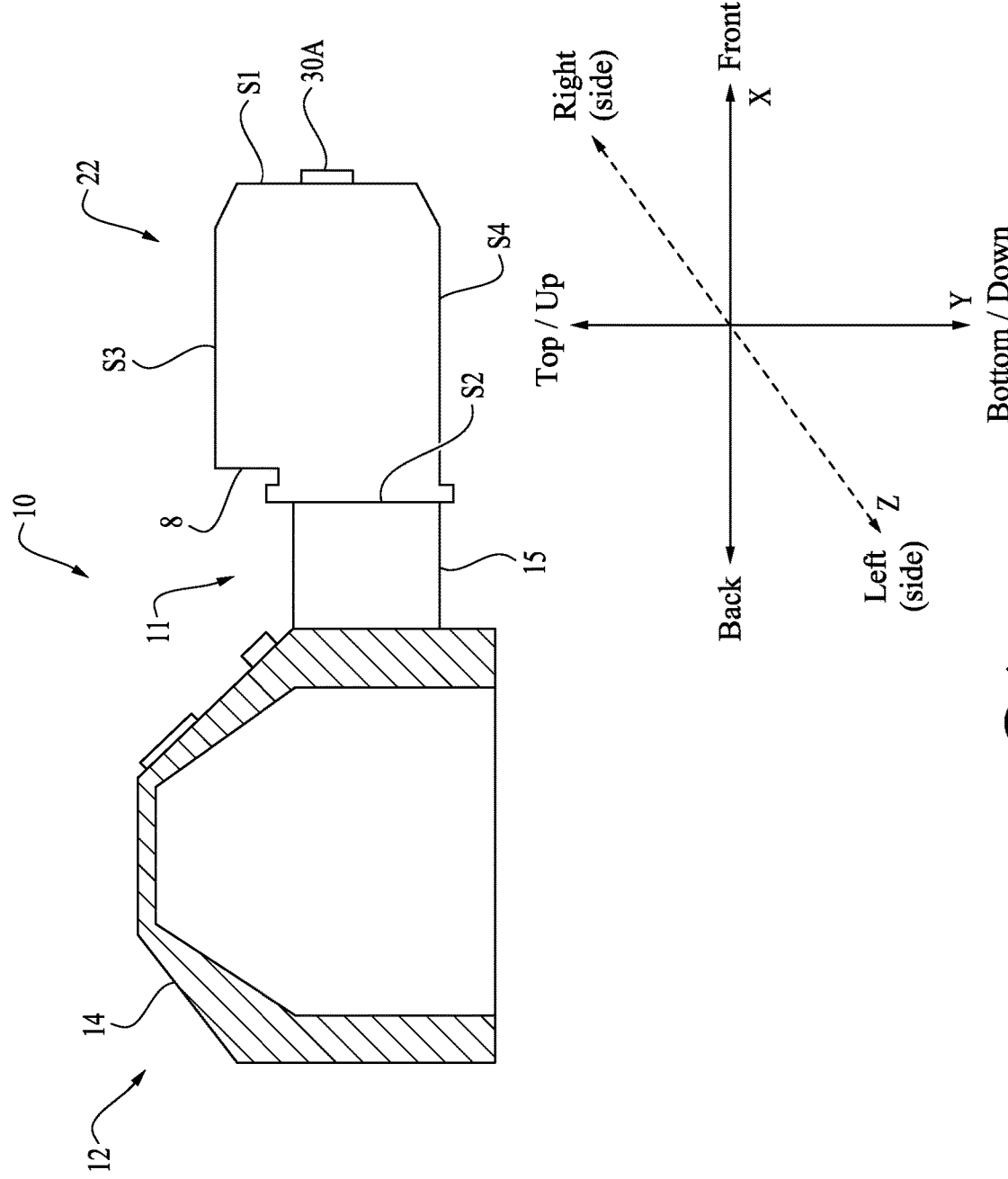

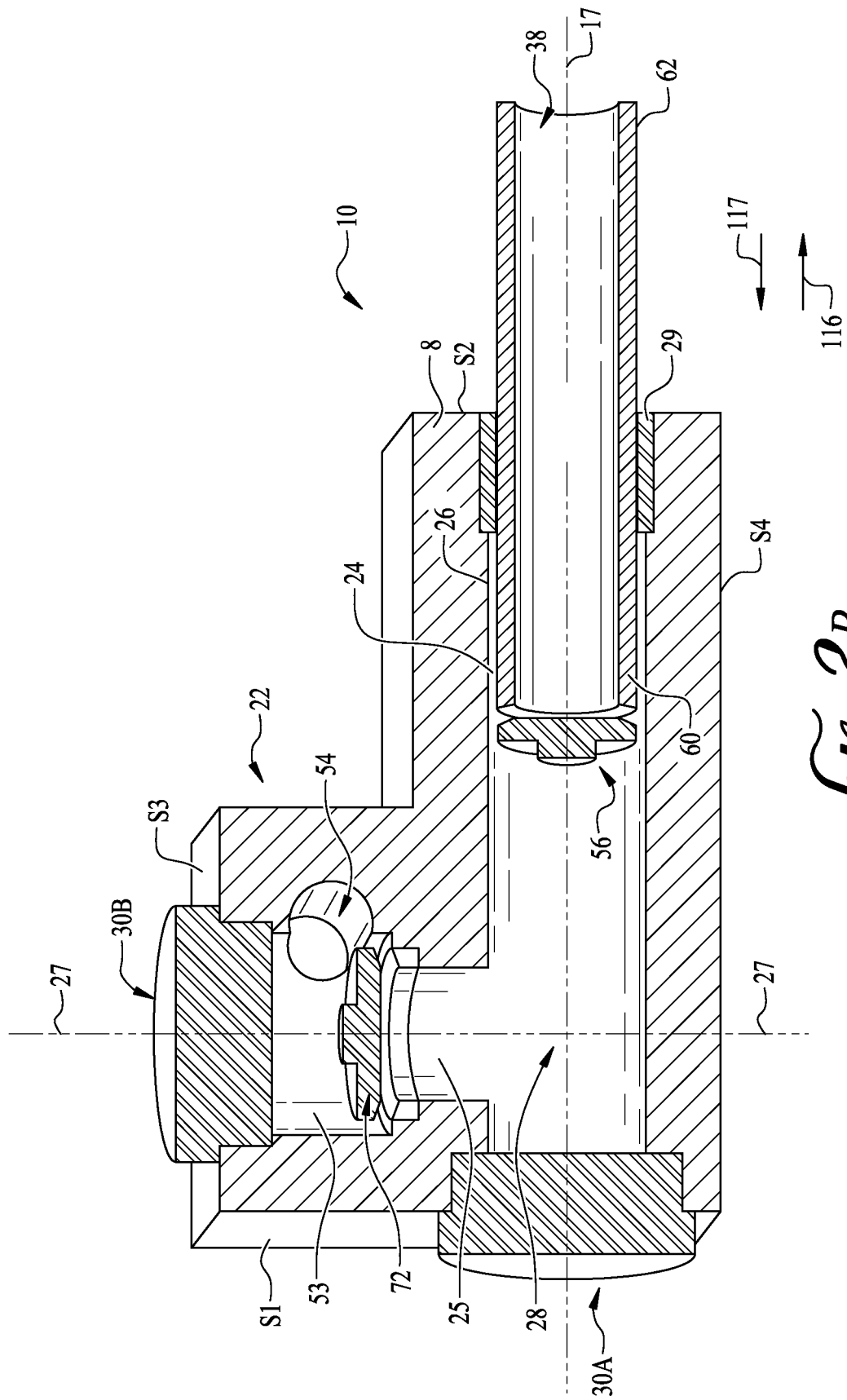

OPTIMAL-CONTACT SUCTION VALVE ASSEMBLY GUIDE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to valves, for example valves contained in pumps that are used to pump a wellbore servicing fluid. More particularly, the present disclosure relates to valves used in reciprocating devices for pumping fluids into a wellbore and methods of using same.

BACKGROUND

High-pressure pumps having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally taken into account when designing a pump for use in oil and gas operations. One design consideration may concern life and reliability of pump fluid end components, as reciprocating pumps used in wellbore operations, for example, often encounter high cyclical pressures and various other conditions that can render pump components susceptible to wear and result in a need for servicing and maintenance of the pump.

Accordingly, it is desirable to provide a valve assembly that enhances life and reliability of a reciprocating pump comprising same.

BRIEF SUMMARY OF THE DRAWINGS

For a more complete understanding of this disclosure, reference is now made to the following brief description, taken in connection with the accompanying drawings and detailed description, wherein like reference numerals represent like parts.

FIG. 1 is an elevational view of a reciprocating pump.

FIG. 2B is a cut-away illustration of an exemplary reciprocating pump comprising a cross-bore (e.g., a tee-bore ("T-bore")) pump fluid end.

DETAILED DESCRIPTION

Figure 2A:
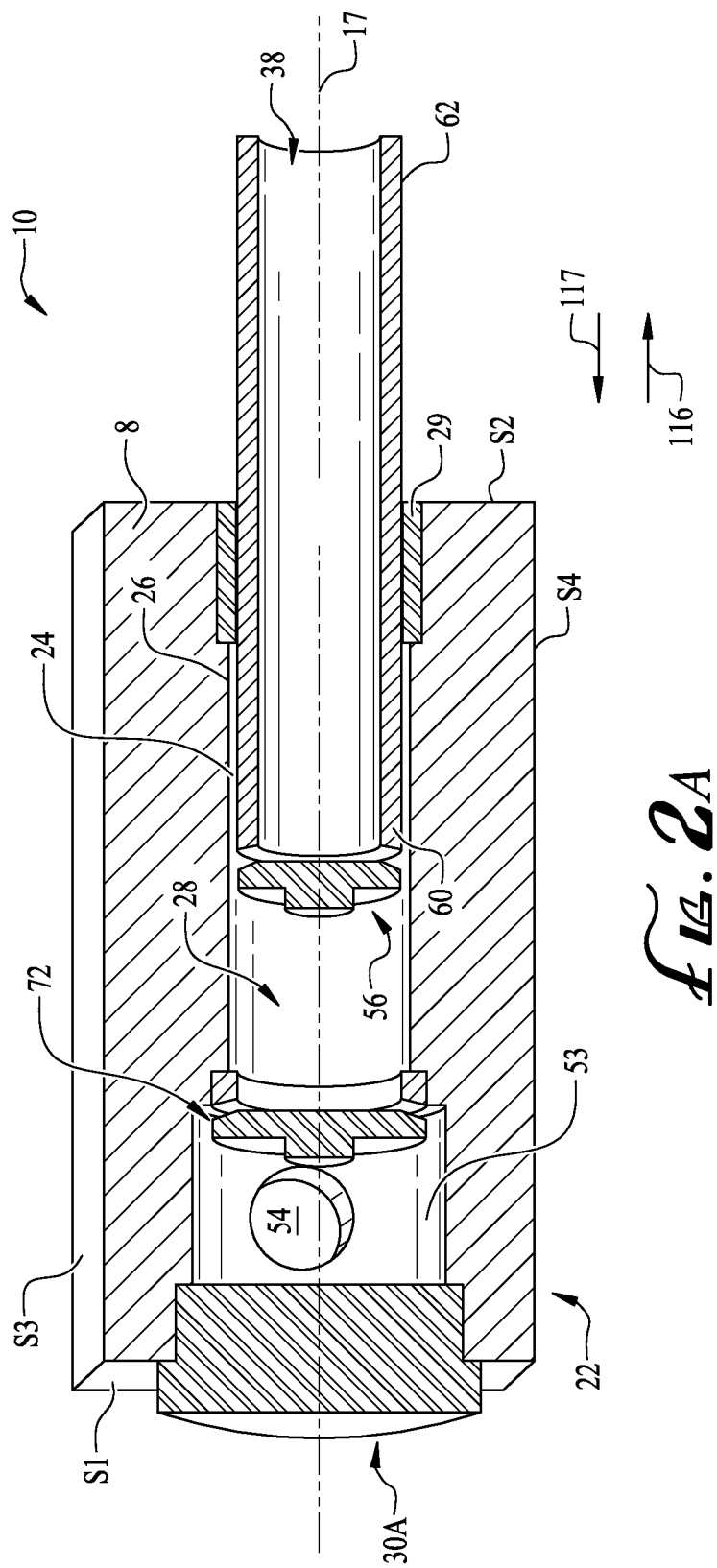
FIG. 2A is a cut-away illustration of an exemplary reciprocating pump comprising a concentric bore pump fluid end.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In plunger or piston pumps using horizontally oriented valves, such as in concentric pumps, certain designs can require the use of valves having guides on one side of the sealing surface, and such valves can be referred to as horizontal guided valves or horizontal guided valve assemblies. The eccentricity of a valve (e.g., a suction valve on a high pressure frac pump) can lead to decreased life of the valve and associated components (e.g., a valve body, valve seat, and plunger).

This support (e.g., skis or sliding surfaces, lower wings 44A/44B) provided by the valve guide of the valve assembly described herein promotes adequate centering of the valve while minimizing flow obstruction and optimizing surface contact and life of the valve assembly and associated components (e.g., a plunger or reciprocating element). The design of the presently disclosed horizontal guided valve provides for the valve stem (also referred to herein as a "valve guide rod") being initially held vertically higher that the central axis of the housing bore in which the horizontal valve assembly is positioned. This allows for an increased life span of the horizontal valve assembly During operation, wear of portions of the horizontal guided valve (e.g., wear of lower wings or skis thereof, as described further hereinbelow) can result in gradually transitioning of the central axis of a valve stem of the horizontal guided valve (e.g., the central axis of a valve guide body, as described hereinbelow) from above a central axis of the housing bore (e.g., a reciprocating element bore) to coincident with the central axis of the housing bore (e.g., the reciprocating element bore), and finally to a position below the central axis of the housing bore (e.g., the reciprocating element bore), at which time the horizontal valve assembly may be replaced.

Disclosed herein is a reciprocating apparatus for pumping pressurized fluid. In embodiments, the reciprocating apparatus comprises a horizontal valve assembly comprising a valve body; a valve guide; and a valve stem, wherein the valve guide comprises: a valve guide body, wherein the valve guide body is substantially cylindrical and has a valve guide bore extending longitudinally therethrough along a valve guide bore central axis. and wherein, in an assembled configuration of the horizontal valve assembly, the valve stem passes at least partially through the valve guide bore and connects the valve body to the valve guide. When the horizontal valve assembly is initially positioned in a housing bore prior to use, the valve guide bore central axis is vertically higher than a central axis of the housing bore.

A reciprocating apparatus of this disclosure may comprise any suitable pump operable to pump fluid. Non-limiting examples of suitable pumps include, but are not limited to, piston pumps, plunger pumps, and the like. In embodiments, the pump is a rotary- or reciprocating-type pump such as a positive displacement pump operable to displace pressurized fluid. The pump comprises a pump power end, a pump fluid end, and an integration section whereby a reciprocating element (e.g., a plunger) can be mechanically connected with the pump power end such that the reciprocating element can be reciprocated within a reciprocating element bore of the pump fluid end. FIG. 1 is an elevational view (e.g., side view) of a pump 10 (e.g., a reciprocating pump) according to an exemplary embodiment, the reciprocating pump comprising a pump power end 12, a pump fluid end 22, and an integration section 11. As illustrated in FIG. 1, pump fluid end has a front S1 opposite a back S2 along a first or x-axis, a top S3 opposite a bottom S4 along a second or y-axis, wherein the y-axis is in the same plane as and perpendicular to the x-axis, and a left side and a right side along a z-axis, wherein the x-axis is along a plane perpendicular to the plane of the x-axis and the y-axis. Accordingly, toward the top of pump fluid end 22 (and pump 10) is along the y-axis toward top S3, toward the bottom of pump fluid end 22 (and pump 10) is along the y-axis toward bottom S4, toward the front of pump fluid end 22 (and pump 10) is along the x-axis toward front S1, and toward the back of pump fluid end 22 (and pump 10) is along the x-axis away from front S1.

The pump fluid end 22 is integrated with the pump power end 12 via the integration section 11, such that pump power end 12 is operable to reciprocate the reciprocating element 18 within a reciprocating element bore 24 (FIG. 2A/FIG. 2B) of the pump fluid end 22. The reciprocating element bore 24 is at least partially defined by a cylinder wall 26. As described further hereinbelow with reference to FIG. 2A, pump fluid end 22 of this disclosure can be an in-line or "concentric" bore pump fluid end. In alternative embodiments, described further hereinbelow with reference to FIG. 2B, pump fluid end 22 is a "cross-bore" pump fluid end 22 (also referred to herein as a multi-bore pump fluid end), which, as utilized herein, can include "T-bore" pump fluid ends. FIG. 2A is a schematic showing a concentric bore pump fluid end 22 engaged with a reciprocating element 18. FIG. 2B is a schematic showing a tee-bore pump fluid end 22 engaged with a reciprocating element 18. In a tee-bore pump fluid end 22, reciprocating element bore 24 and tee-bore 25 are perpendicular, making the shape of a "T". As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 3:
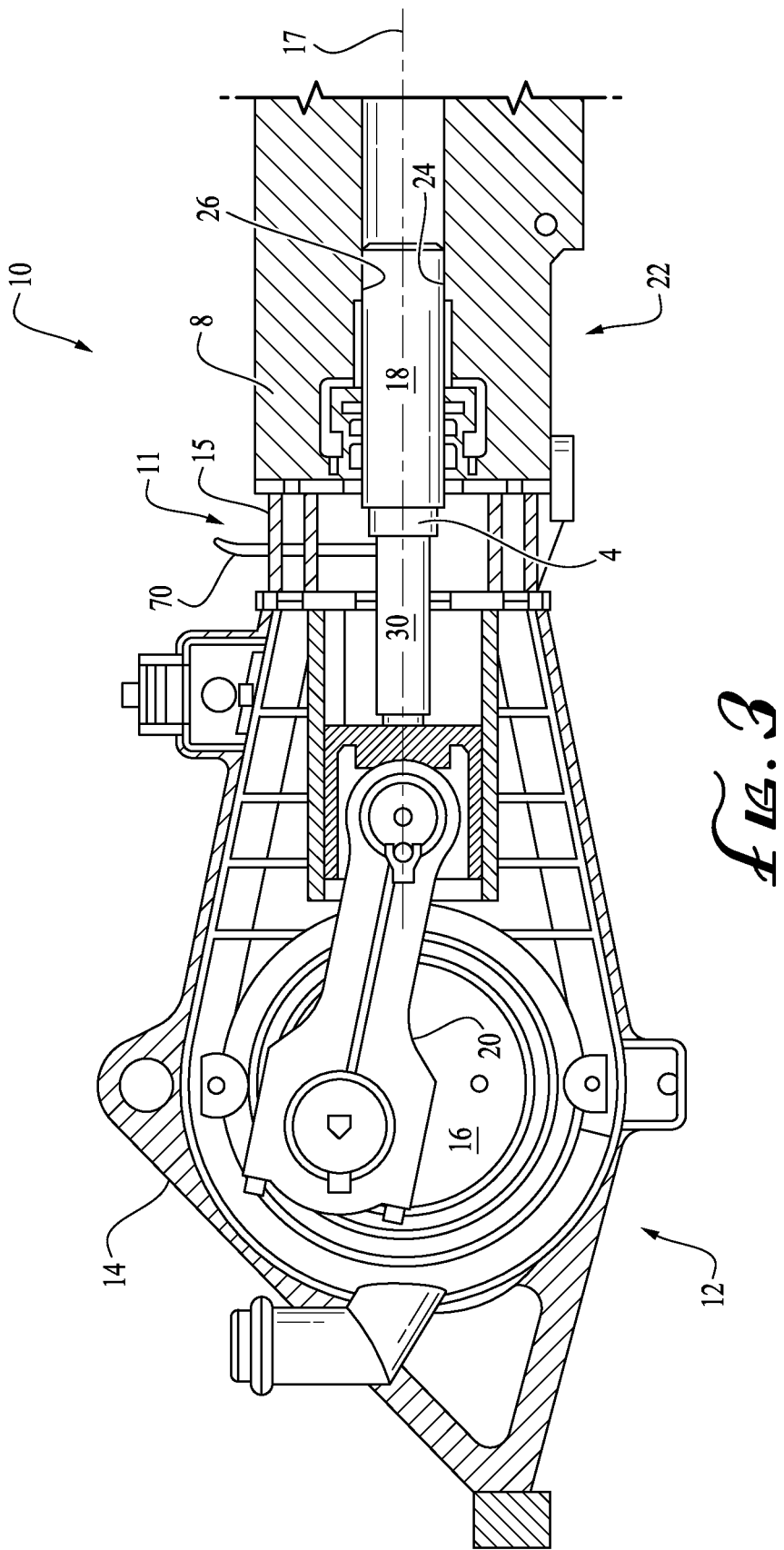
FIG. 3 is cut-away illustration of a pump power end of a pump.

Those versed in the art will understand that the pump power end 12 may include various components commonly employed in pumps. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 3 provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm 20 and pushrod 30. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm rod 20, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", and not wishing to be limited to a particular reciprocating element 18). Pump 10 of FIG. 1 is typically mounted on a movable structure such as a semitractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 20).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIG. 2A and FIG. 2B. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1 and indicated by arrow 117 of FIG. 2A and FIG. 2B) and return strokes (also referred to as suction strokes and correlating to movement in a negative direction parallel to the x-axis of FIG. 1 and indicated by arrow 116 in FIG. 2A and FIG. 2B), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. When discharge valve assembly 72 is in a closed configuration (e.g., under the influence of a closing mechanism, such as a spring, the high pressure in a discharge pipe or manifold containing discharge outlet 54) prevents fluid flow into discharge chamber 53 and causes pressure in the pump chamber 28 to accumulate upon stroking of the reciprocating element 18. When the reciprocating element 18 begins the forward or discharge stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body (e.g., a movable poppet) and a valve seat thereof) and a configuration in which fluid cannot flow through the valve assembly (e.g., cannot pass between a valve body (e.g., a movable poppet) and a valve seat thereof). As the reciprocating element 18 extends forward, fluid within the pump chamber 28 is discharged through the discharge outlet 54.

During a return or suction stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiment of FIG. 2A, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric bore configuration of FIG. 2A, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). With reference to the embodiment of FIG. 2B, which is a schematic showing a T-bore pump fluid end 22 engaged with a reciprocating element 18, T-bore pump fluid end 22 comprises a T-bore fluid end body 8, a T-shaped pump chamber 28, a suction valve assembly 56, and a discharge valve assembly 72. In this T-bore configuration of FIG. 2B, suction valve assembly 56 is coupled with front end 60 of reciprocating element 18 and discharge valve assembly 72 is positioned in bore 25 that makes a tee with reciprocating element bore 24, i.e., central axis 17 of reciprocating element bore 24 is also the central axis of suction pump assembly 56 and perpendicular to a central axis 27 of discharge valve assembly 72).

Suction valve assembly 56 and discharge valve assembly 72 are operable to direct fluid flow within the pump 10. In pump fluid end 22 designs of this disclosure, fluid flows within a hollow reciprocating element (e.g., a hollow plunger) 18 via fluid inlet 38 located toward tail end 62 of reciprocating element 18. The reciprocating element bore 24 of such a fluid end design can be defined by a high pressure cylinder or cylinder wall 26 providing a high pressure chamber. (As utilized here, "high pressure" indicates possible subjection to high pressure during discharge.) When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a pump fluid end 22 design of this disclosure, the fluid inlet 38 is configured to introduce fluid into pump chamber 28 via a reciprocating element 18 that is hollow. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. With reference to the concentric fluid end body 8 embodiment of FIG. 2A, a front access port 30A can be located on a front S1 of the pump fluid end 22 opposite a back S2 of the pump fluid end 22, wherein the back S2 of the pump fluid end is proximal the pump power end 12, upon integration therewith via integration section 11. With reference to the T-bore fluid end body 8 embodiment of FIG. 2B, a front access port 30A can be located on a front S1 of the pump fluid end 22 opposite a back S2 of the pump fluid end 22, wherein the back S2 of the pump fluid end is proximal the pump power end 12, upon integration therewith via integration section 11, and a top access port 30B can be located on a top S3 of the pump fluid end 22 opposite a bottom S4 of pump fluid end 22. Locations described as front S1, back S2, top S3, and bottom S4 are further described with reference to the x-y-z coordinate system shown in FIG. 1 and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port. In embodiments, the at least one access port is located on a side of the discharge valve assembly 72 opposite the suction valve assembly 56. For example, in the concentric bore pump fluid end 22 embodiment of FIG. 2A, front access port 30A is located on a side (e.g., front side) of discharge valve assembly 72 opposite suction valve assembly 56. In the T-bore pump fluid end 22 embodiment of FIG. 2B, front access port 30A is located on top S3 of pump fluid end 22.

In embodiments, one or more seals 29 (e.g., "o-ring" seals, packing seals, or the like), also referred to herein as 'primary' reciprocating element packing 29 (or simply "packing 29") may be arranged around the reciprocating element 18 to provide sealing between the outer walls of the reciprocating element 18 and the inner walls 26 defining at least a portion of the reciprocating element bore 24. In some concentric bore fluid end designs, a second set of seals (also referred to herein as 'secondary' reciprocating element packing; not shown in the Figures) may be fixedly arranged around the reciprocating element 18 to provide sealing between the outer walls of the reciprocating element 18 and the inner walls of a low-pressure cylinder that defines the low pressure chamber described hereinabove (e.g., wherein the secondary packing is farther back along the x-axis and delineates a back end of the low pressure chamber that extends from the primary packing 29 to the secondary packing). Skilled artisans will recognize that the seals may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1 (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 can have an inner diameter slightly greater than the outer diameter of the reciprocating element 18, such that the reciprocating element 18 may sufficiently reciprocate within reciprocating element bore 24 (optionally within a sleeve as described herein). In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("oversleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or over-sleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit (e.g., interference fit) into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages 4 (FIG. 3; e.g., clamps, adapters, extensions, etc.) may be used to couple the reciprocating element 18 to the pump power end 12 (e.g., to a pushrod 30).

In some embodiments (e.g., T-bore pump fluid end 22 embodiments such as FIG. 2B), the reciprocating element 18 may be substantially solid and/or impermeable (e.g., not hollow). In some embodiments, reciprocating element 18 employed in a concentric bore pump fluid end 22 embodiment (such as depicted in FIG. 2A) or a cross-bore pump fluid end 22 (such as depicted in FIG. 2B) comprises a peripheral wall defining a hollow body. Additionally (e.g., concentric bore pump fluid end 22 embodiments such as FIG. 2A), a portion of the peripheral wall of reciprocating element 18 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end, when assembled, may be substantially solid and/or impermeable (e.g., a plunger having both a hollow portion and a solid portion).

The reciprocating element 18 comprises a front or free end 60. In embodiments comprising concentric bore pump fluid end designs 22 such as shown in FIG. 2A, the reciprocating element 18 can contain or at least partially contain the suction valve assembly 56. In embodiments, the suction valve assembly 56 is at least partially disposed within the reciprocating element 18 at or proximate to the front end 60 thereof. At an opposite or tail end 62 (also referred to as back or tail end 62) of the reciprocating element 18, the reciprocating element 18 may include a base coupled to the pump power end 12 of the pump 10 (e.g., via crank arm 20). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within reciprocating element bore 24 and at least partially within reciprocating element 18 in concentric bore pump fluid end 22 designs such as FIG. 2A or T-bore pump fluid end 22 designs such as FIG. 2B, such that a suction valve body of the suction valve assembly 56 moves away from a suction valve seat within the a suction valve seat housing of reciprocating element 18 when the suction valve assembly 56 is opening and toward the suction valve seat when the suction valve assembly 56 is closing.

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed proximal the front S1 of bore 24 (e.g., at least partially within discharge chamber 53 and/or pump chamber 28) of the pump fluid end 22, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. In addition, in concentric bore pump fluid end 22 configurations such as FIG. 2A, the discharge valve assembly 72 may be coaxially aligned with the suction valve assembly 56 (e.g., along central axis 17), and the suction valve assembly 56 and the discharge valve assembly 72 may be coaxially aligned with the reciprocating element 18 (e.g., along central axis 17). In alternative embodiments, such as the T-bore pump fluid end 22 embodiment of FIG. 2B, discharge valve assembly 72 can be positioned within T-bore 25, at least partially within discharge chamber 53 and/or pump chamber 28, and have a central axis coincident (e.g., coaxial) with central axis 27 of T-bore 25.

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, poppets, etc.) and/or components may be employed suitable means for retaining the components of the suction valve assembly 56 and the components of the discharge valve assembly 72 within the pump fluid end 22 may be employed.

The fluid inlet 38 may be arranged within any suitable portion of the pump fluid end 22 and configured to supply fluid to the pump in any direction and/or angle. Moreover, the pump fluid end 22 may comprise and/or be coupled to any suitable conduit (e.g., pipe, tubing, or the like) through which a fluid source may supply fluid to the fluid inlet 38. The pump 10 may comprise and/or be coupled to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In embodiments, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q-10™ Quintuplex Pump or an HT-400™ Triplex Pump, produced by Halliburton Energy Services, Inc.

In embodiments, the pump fluid end 22 may comprise an external manifold (e.g., a suction header) for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 of the pump 10 according to any suitable manner. For instance, separate connectors (e.g., cranks arms/connecting rods 20, one or more additional components or mechanical linkages 4, pushrods 30, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the multiple reciprocating elements may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIGS. 2A and 2B) forward in its cylinder. A top dead center position corresponds to the position of a fully extended reciprocating element at zero velocity, e.g., just prior to a reciprocating element moving backward (i.e., in a direction indicated by arrow 116 in FIGS. 2A and 2B) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

Figure 4:
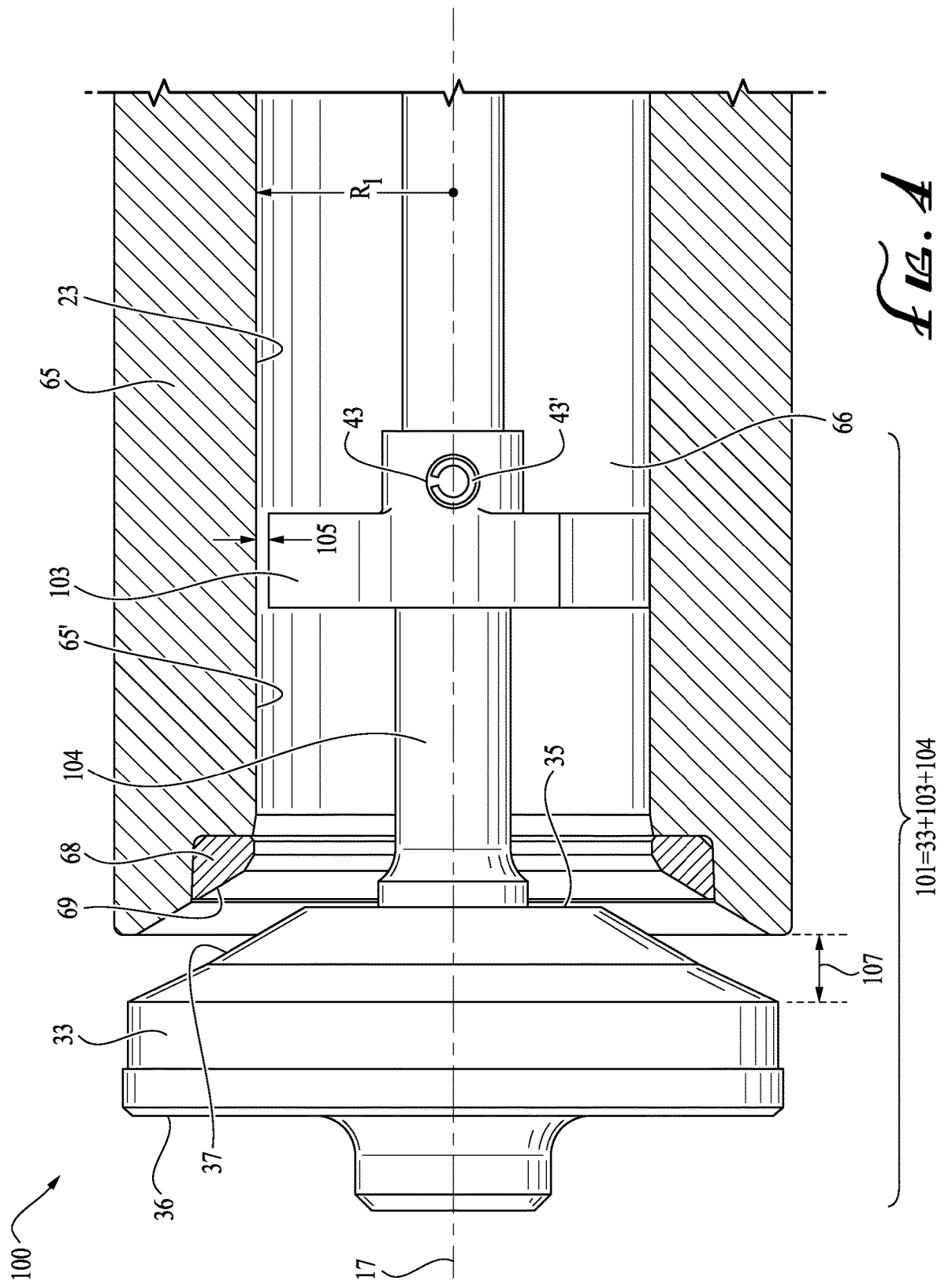
FIG. 4 is a schematic of a horizontal valve assembly in a housing, according to embodiments of this disclosure.
Figure 5:
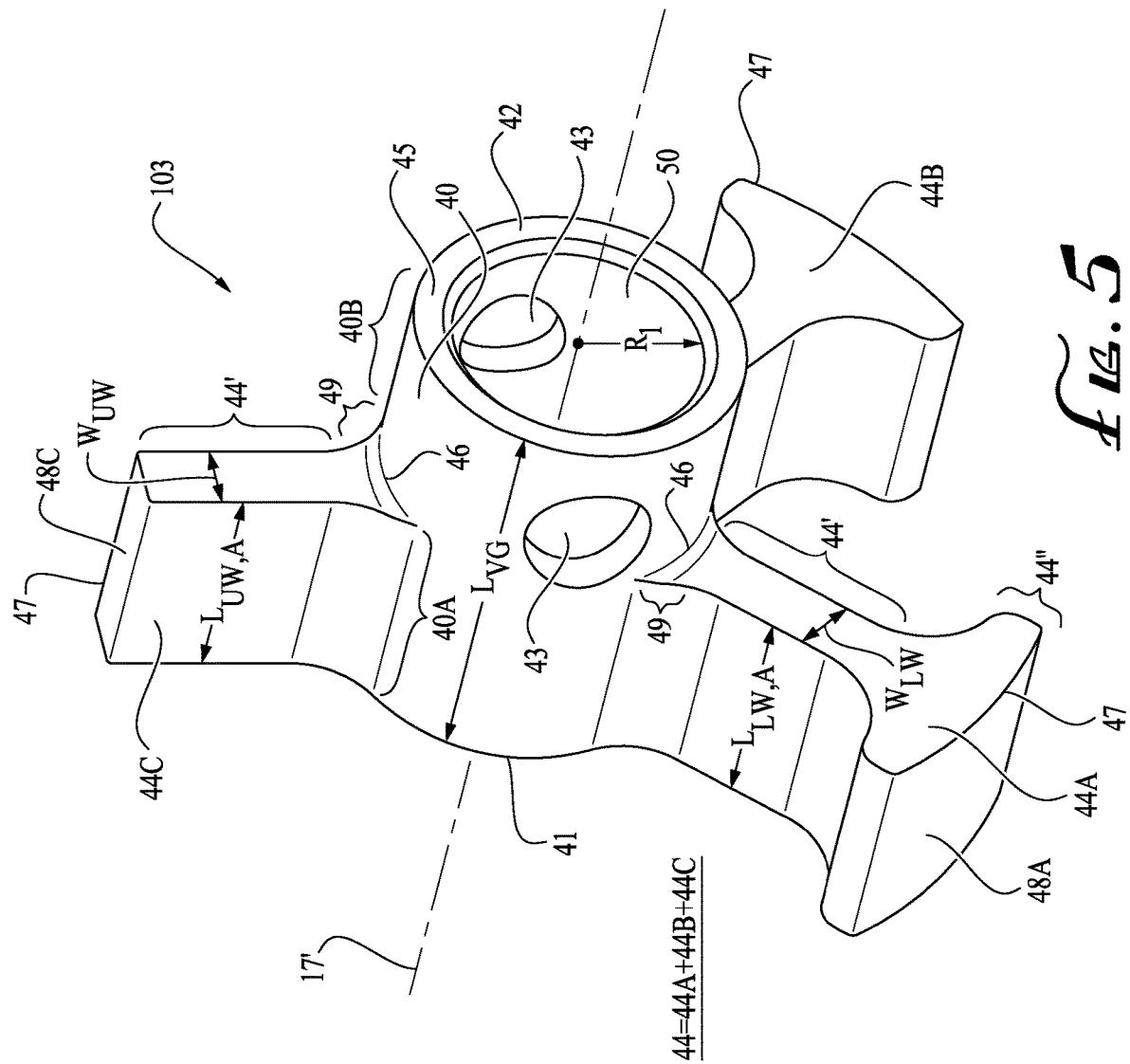
FIG. 5 is a schematic isometric view of a valve guide that can be included in the horizontal valve assembly of FIG. 4.
Figure 6:
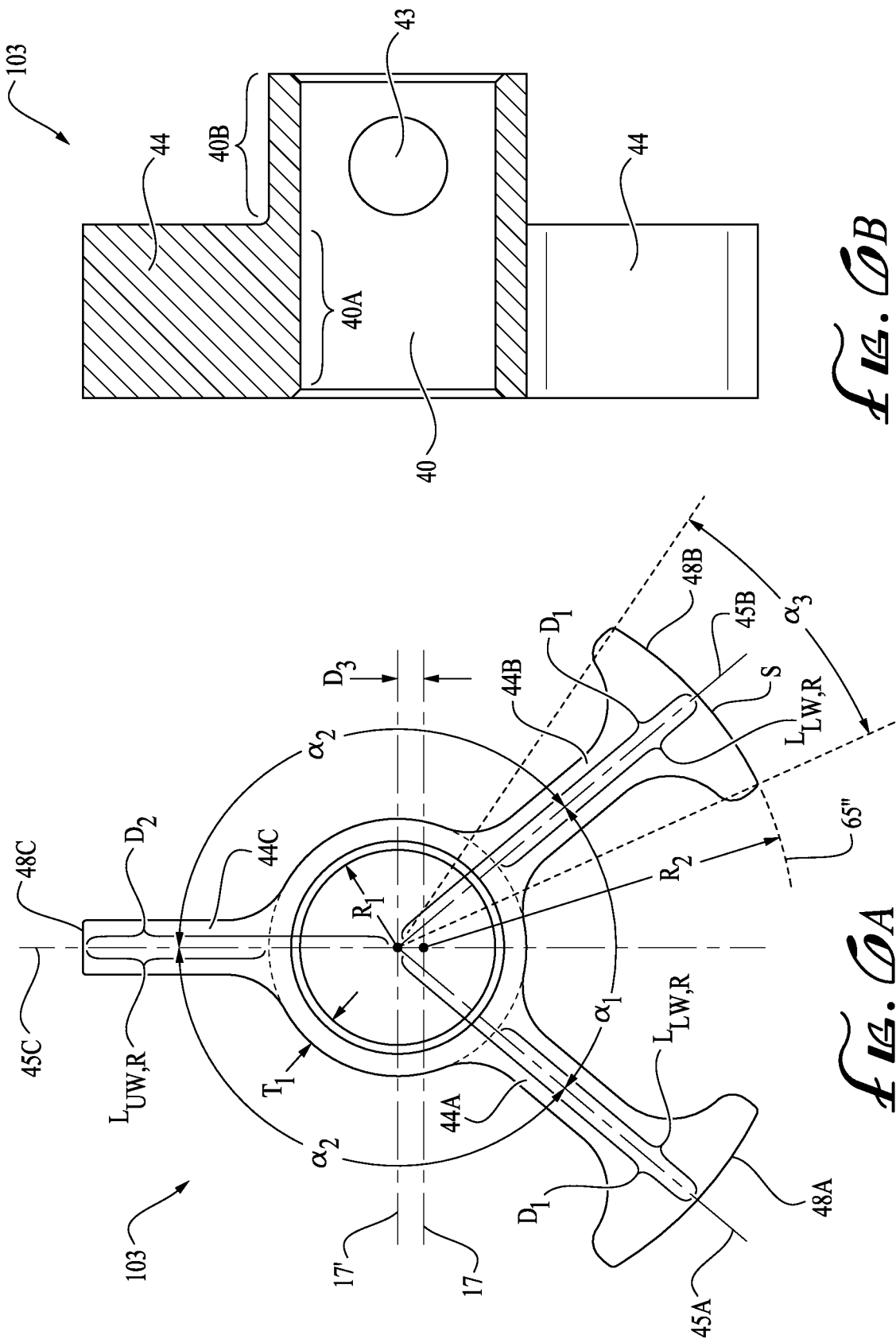
FIG. 6A is a schematic cross section view of a valve guide that can be included in the horizontal valve assembly of FIG. 4.
FIG. 6B is a schematic side view of the valve guide of FIG. 6A.
Figure 7:
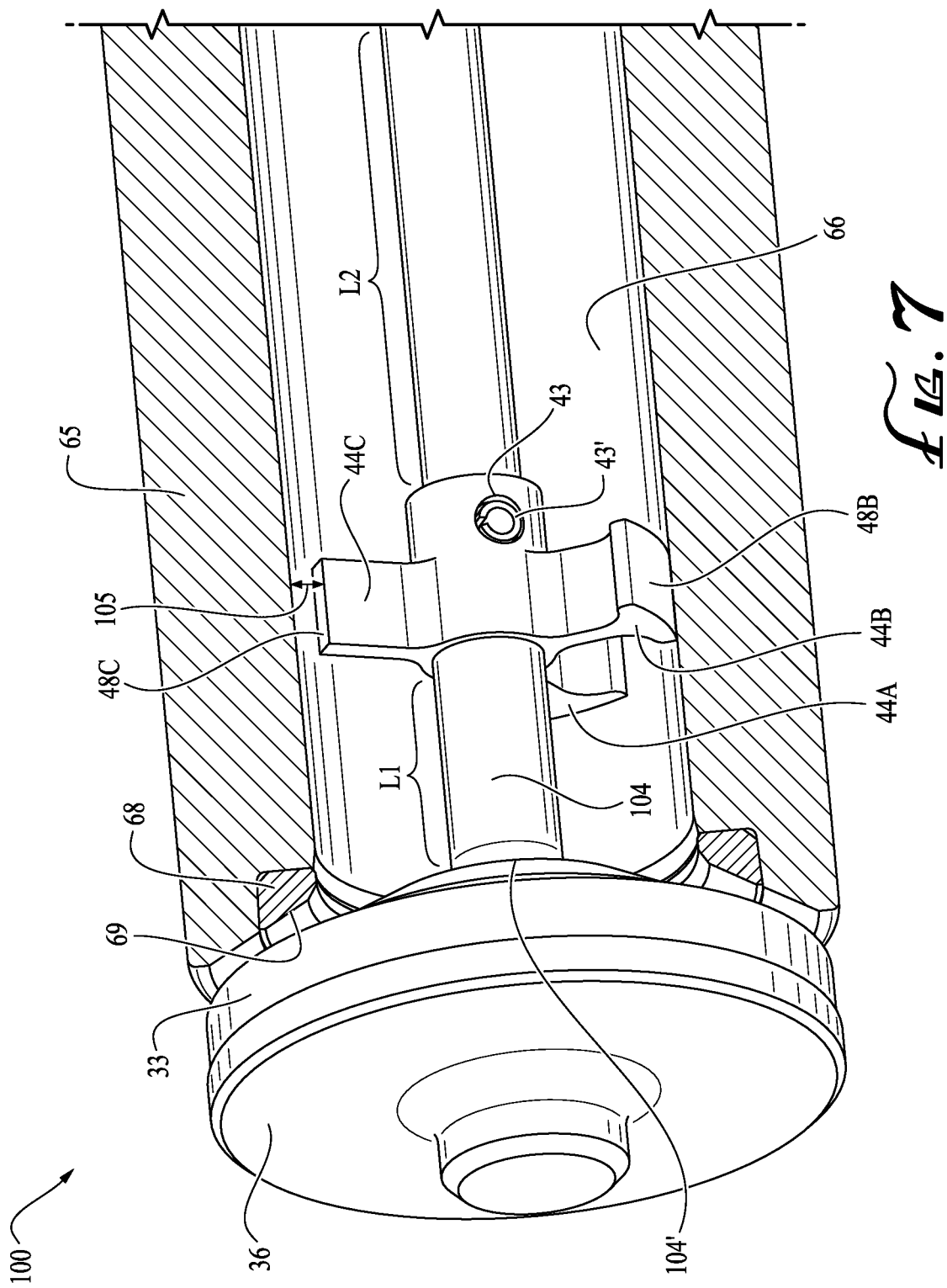
FIG. 7 is a perspective view of the horizontal valve assembly of FIG. 4.
Figure 8:
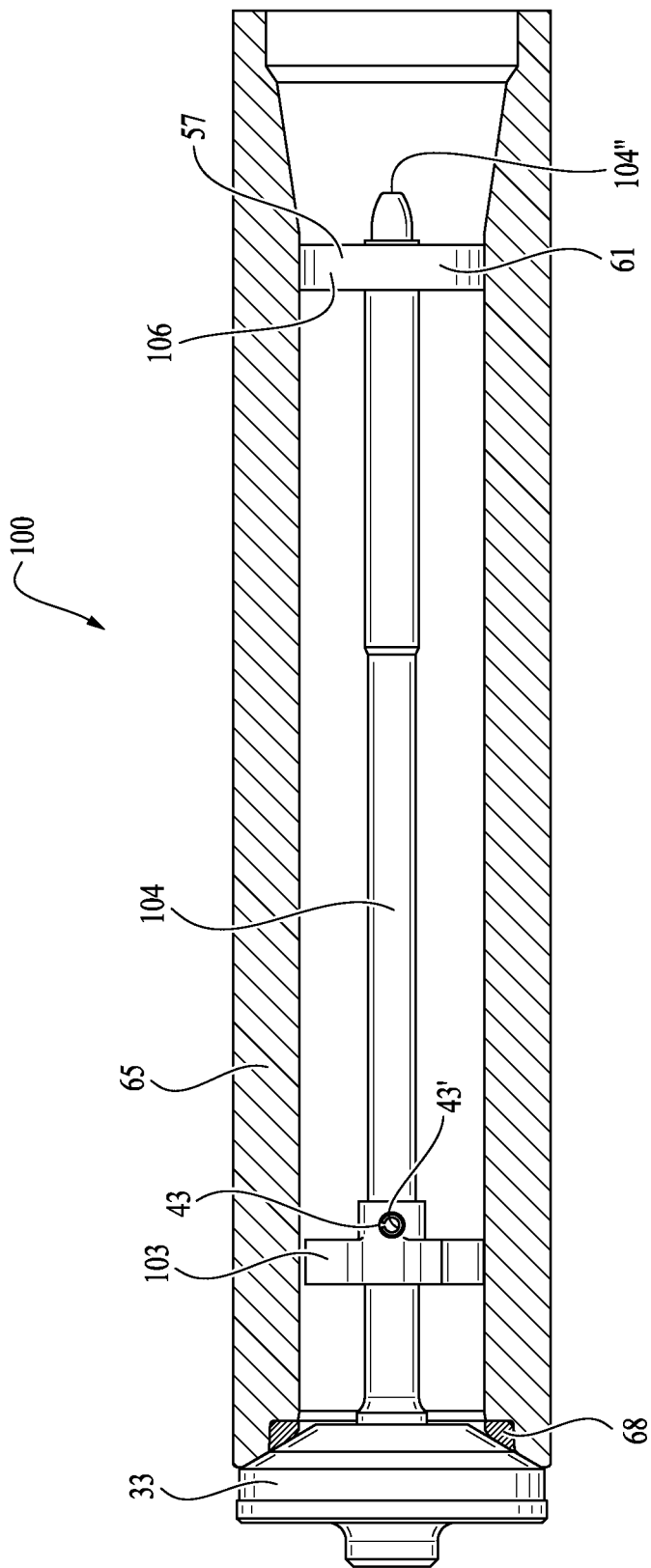
FIG. 8 is a schematic of a horizontal valve assembly according to embodiments of this disclosure in a housing bore.

FIG. 4 is a schematic of a horizontal valve assembly 100, in an open configuration, positioned in a housing bore 66 of a housing 65, according to embodiments of this disclosure; FIG. 5 is a schematic isometric view of a valve guide 103 that can be included in the horizontal valve assembly 100 of FIG. 4, according to embodiments of this disclosure; FIG. 6A is a schematic cross section view of a valve guide 103 that can be included in the horizontal valve assembly 100 of FIG. 4; FIG. 6B is a schematic side view of the valve guide 103 of FIG. 6A; and FIG. 7 is a perspective view of the horizontal valve assembly 100 of FIG. 4; and FIG. 8 is a schematic of a horizontal valve assembly 100 according to embodiments of this disclosure, in an open configuration, in a housing bore 66 of a housing 65.

Referring to FIG. 4, a horizontal valve assembly 100 can be disposed within a housing 65 having a valve seat 68 and a valve body contact surface 69. The valve seat 68 and valve body contact surface 69 may be provided by an insert placed within the housing 65 or may be integral with (e.g., formed from, for example via machining) the housing 65. The horizontal valve assembly 100 comprises a valve body 33, a valve guide 103, and a valve stem 104 connecting the valve body 33 to the valve guide 103. A valve spring 31 can be present in a bore 66 of the housing 65. The housing bore 66 has a central axis 17. In a normally (e.g., biased) closed position, a valve body contact surface 69 of valve seat 68 contacts a valve seat contact surface 37 of valve body 33, preventing or minimizing fluid flow through horizontal valve assembly 100. As seen in FIG. 4, in an open configuration, valve body contact surface 69 of valve seat 68 does not contact valve seat contact surface 37 of valve body 33, thus allowing fluid flow through (e.g., into space 107 between valve seat contact surface 37 of valve body 33 and valve body contact surface 69 of valve seat 68 of) valve assembly 100.

As noted above, the horizontal valve assembly 100 comprises a valve body 33; a valve guide 103; and a valve stem 104. The valve guide 103 comprises: a valve guide body 40. The valve guide body 40 can be substantially cylindrical and has a valve guide bore 50 extending longitudinally therethrough along a valve guide bore central axis (or "centerline") 17'. In an assembled configuration of the horizontal valve assembly 100, the valve stem 104 passes at least partially through the valve guide bore 50 and connects the valve body 33 to the valve guide 103. The valve guide body 40 can further comprise wings 44. For example, as depicted in FIG. 5, the valve guide body 40 can comprise three wings 44. Alternatively, the valve guide body 40 can comprise two or more than three (e.g. 4, 5, or more) wings 44.

As depicted in the embodiment of FIG. 5, valve guide 103 can comprise first and second lower wings (also referred to herein as first and second "legs", first and second "skis", or first and second "sliding surfaces") (e.g., first lower wing or ski 44A and second lower wing or ski 44B). Each of the first ski 44A and the second ski 44B extends radially outward from the valve guide body 40 to a lower wing or ski outer surface (also referred to herein as a "contact surface") 48A/48B at a distal end (e.g., outer end 47 of ski) thereof, such that the lower wing or ski outer surface 48A/48B is a first radial distance $D_1$ from the valve guide bore central axis 17' of valve guide body 40. Valve guide bore 50 of valve guide body 40 can have a valve guide interior radius $R_1$; interior radius $R_1$ of valve guide bore 50 can be in a range of from about 0.1 to about 0.5, from about 0.12 to about 0.5, or from about 0.2 to about 0.5 inch (e.g., from about 2.54 to about 12.7, from about 3.0 to about 12.7, or from about 5.0 to about 12.7 mm). As further depicted in the embodiment of FIG. 5, valve guide 103 can further comprise an upper wing 44C extending radially outward from the valve guide body 40 to an upper wing outer surface 48C at a distal end thereof, such that the upper wing outer surface 48C is a second radial distance $D_2$ from the valve guide bore central axis 17'. In embodiments, the first radial distance $D_1$ is greater than an interior radius $R_2$ of a housing bore 66 of a housing 65 in which the horizontal valve assembly 100 is positioned for use, such that, when the horizontal valve assembly 100 is initially positioned in the housing bore 66 prior to use, the valve guide bore central axis 17' is vertically higher than the central axis 17 of the housing bore 66 of the housing 65. A valve spring 31 can be present in a bore 66 of the housing 65.

In embodiments, the first radial distance $D_1$ is greater than the interior radius $R_2$ of the housing bore 66 of the housing 65 by a vertical offset distance $D_3$ of at least 0.03, 0.04, 0.05, 0.06, 0.07, 0.08, 0.09, or 0.1 inch (0.76, 1.02, 1.27, 1.52, 1.78, 2.03, or 2.29 mm), when the valve guide 103 is initially installed in the horizontal valve assembly 100, such that when the horizontal valve assembly 100 is initially positioned in the housing bore 66 of the housing 65 prior to use, and the lower wing outer (e.g., contact) surface 48 (e.g., 48A and/or 48B) of each of the first and second lower wings 44A/44B contacts an interior surface 65' of the housing bore 66 of the housing 65, the central axis 17' of the valve guide bore 66 is, along an axial length $L_{VG}$ of the valve guide 103, vertically higher than the central axis 17 of the housing bore 66 of the housing 65 by approximately the offset distance $D_3$.

The first radial distance $D_1$ can be greater than the second radial distance $D_2$, such that, when the horizontal valve assembly 100 is initially positioned in the housing bore 66 of the housing 65 prior to use, a gap 105 is provided between the upper wing outer surface 48C and an interior surface 65' of the housing bore 66 of the housing 65. In embodiments, the gap 105 can be greater than or equal to about 0.4, 0.5, 0.6, 0.7, or 0.8 inch (10.2, 12.7, 15.2, 17.8, or 20.3 mm).

The valve guide body 40 can have an axial length $L_{VG}$ (e.g., substantially parallel to valve guide bore central axis 17'), and the first lower wing 44A, the second lower wing 44B, and the upper wing 44C can extend radially outward along a first portion 40A of the valve guide body 40, wherein the first portion 40A extends axially from a first end 41 of the valve guide body 40 toward a second end 42 of the valve guide body 40. When initially positioned in housing bore 66 of the housing 65, a centerline 45C of upper wing 44C can be substantially vertical; a centerline 45A of first lower wing 44A can be positioned an angle $\alpha_1$ from a centerline 45B of second lower wing 44B, and first lower wing 44A and second lower wing 44B can each be positioned such that the centerline 45A of first lower wing 44A and centerline 45B of second lower wing 44B are an angle $\alpha_2$ from centerline 45C of upper wing 44C, as best depicted in FIG. 6A. In embodiments, angle $\alpha_1$ between centerline 45A of first lower wing 44A and centerline 45B of second lower wing 44B can be in a range of from about 10 to about 90, from about 10 to about 80, from about 20 to about 70, or from about 30 to about 60 degrees. First lower wing 44A and second lower wing 44B are referred to herein as "lower" wings, as the centerlines thereof (e.g., centerline 45A of first lower wing 44A and centerline 45B of second lower wing 44B) extend below horizontal. Accordingly, angle $\alpha_2$ between centerline 45A of first lower wing 44A and centerline 45C of upper wing 44C, and angle $\alpha_2$ between centerline 45B of second lower wing 44B and centerline 45C of upper wing 44C can be greater than 90 degrees. In embodiments, angle $\alpha_2$ is from about 95 to about 130 degrees, from about 100 to about 130 degrees, or from about 110 to about 130 degrees.

Each of the wings 44 (e.g., first lower wing 44A, second lower wing 44B, and upper wing 44C) can extend from a valve guide body end 46 in contact (or integrated) with valve guide body 40 to an outer end 47 thereof, wherein the outer end 47 comprises the contact surface 48 of the respective wing 44. In embodiments, a radial length $L_{LW,R}$ of the lower wings (e.g., first lower wing 44A and second lower wing 44B) along the centerline 45 thereof (e.g., centerline 45A of first lower wing 44A and centerline 45B of second lower wing 44B) from valve guide body end 46 thereof to outer end 47 thereof can be in a range of from about 0.75 to about 3, from about 0.8 to about 3, or from about 0.5 to about 4 inch (e.g., from about 19.05 to about 76.2, from about 20.3 to about 76.2, or from about 12.7 to about 101.6 mm). In embodiments, a radial length $L_{UW,R}$ of the upper wing 44C along the centerline 45C thereof from valve guide body end 46 thereof to outer end 47 thereof can be in a range of from about 0.5 to about 3, from about 0.6 to about 3, or from about 0.5 to about 4 inch (e.g., from about 12.7 to about 76.2, from about 15.2 to about 76.2, or from about 12.7 to about 101.6 mm) (e.g., short enough to establish clearance or gap 105).

One or more holes 43 can be positioned in the valve guide body 40; the one or more holes 43 can be configured for affixing the valve guide body 40 to the valve stem 104. The one or more holes 43 can be located in a second portion 40B of the valve guide body 40, which second portion 40B extends from a second end 42 of the valve guide body toward a first end 41 of the valve guide body 40, wherein the second end 42 is distal the valve body 33 and opposite a first end 41 of the valve guide body 40. The valve guide 103 can be positioned on the valve stem 104, with a first length $L_{VS,1}$ of the valve stem 103 between the first (e.g., axial) end 41 of the valve guide 103 and the valve body 33 and a second length $L_{VS,2}$ of the valve stem 104 between the second (e.g., axial) end 42 of the valve guide 103 and a second end 104" of the valve stem 104, which second end 104" of the valve stem 40 is distal the valve body 33, while a first end 104' of the valve stem 104 is proximate and coupled with the valve body 33. The valve guide body 40 can be coupled to the valve stem 104 via one or more set screws 43', roll pins, dowel pins, spring pins, or a combination thereof positioned in the one or more holes 43.

The valve guide body 40 can comprise (e.g., substantially cylindrical) walls 45 having a thickness $T_1$ of greater than or equal to about 0.06, 0.07, 0.08, 0.09, 0.10 inch (e.g., 1.27, 1.52, 2.03, 2.29, 2.54 mm), and/or less than or equal to about 0.3, 0.25, 0.2, or 0.1 inch (7.62, 6.35, 5.08, or 2.54 mm).

Each wing 44 selected from the first lower wing 44A, the second lower wing 44B, and the upper wing 44C can comprise a valve guide body proximate section 49 and an extender section 44'. The valve guide body proximate section 49 extends radially from a valve guide body end 46 of the each wing to the extender section 44'. The valve guide body proximate section 49 can be flared circumferentially along valve guide body 40. The first lower wing 44A and the second lower wing 44B can each further comprise an outer section 44". The outer section 44" can extend radially from the extender section 44' thereof to the outer surface 48 thereof. The wings 44 (e.g., first lower wing 44A, second lower wing 44B, and/or upper wing 44C) and the valve guide body 40 can be a single integrated, monolithic, unitary component or body, albeit sometimes described separately herein, or can be machined or otherwise formed as disparate components that are subsequently connected for use.

In embodiments, such as that depicted in FIG. 5, the outer surface 48 of upper wing 44C has a rectangular cross section. The rectangular cross section (and the upper wing 44C) can have a width $W_{UW}$ (e.g., perpendicular to the valve guide bore central axis 17') in a range of from about 0.1, 0.15, or 0.2 inch (2.54, 3.81, or 5.08 mm) to about 0.3, 0.35, or 0.4 inch (7.62, 8.89, or 10.16 mm) and/or an axial length $L_{UW,A}$ in a range of from about 0.1, 0.5, 1, or 2 inches (from about 2.54, 12.7, 25.4, or 50.8 mm) to about 0.4, 0.5, 1, or 2 inch (10.16, 12.7, 25.4, or 50.8 mm).

In embodiments, the first lower wing 44A and/or the second lower wing 44B can be "skis". In such embodiments, the outer surface 48 (e.g., first wing outer surface 48A and second wing outer surface 48B) of each of the first lower wing 44A and the second lower wing 44B can extend an axial length $L_{LW,A}$ and/or can be curved along an arc length S, which, arc length S, when the horizontal valve assembly 100 is positioned in the housing bore 66 of the housing 65, can extend along a portion of the inner circumference 65" of the housing bore 66. The portion of the inner circumference 65' can comprise an angle $\alpha_3$ of the inner circumference 65" of the housing bore 66. The angle $\alpha_3$ can comprise from about 10, 20, or 30 to about 20, 30, or 40 degrees (e.g., from about 10 to about 40 degrees) degrees of the inner circumference 65" of the housing bore 66. The arc length S can be equal to the interior radius of the housing bore $R_2$ times the angle $\alpha_3$ in radians.

Also disclosed herein is a pump fluid end 22 comprising: a reciprocating element 18 disposed at least partially within a reciprocating element bore 24 of the pump fluid end 22; a discharge valve assembly 72; and a suction valve assembly 56, wherein the discharge valve assembly 72 and/or the suction valve assembly 56 is a horizontal valve assembly 100 according to this disclosure. In embodiments, the pump fluid end 22 is a concentric bore pump fluid end 22, wherein the discharge valve assembly 72 is positioned at least partially within the reciprocating element bore 24 and is coaxially aligned with the suction valve assembly 56. The suction valve assembly 56 can, in embodiments, comprise the horizontal valve assembly 100 and a valve seat 68, and the reciprocating element 18 can be at least partially hollow and have a front end 60 opposite a tail end 62 along a central axis 17 of the reciprocating element bore 24, and wherein the suction valve assembly 56 is coupled with the front end 60 of the reciprocating element 18.

As shown in FIG. 5B, the valve guide 103 further comprises a coupler 39. Valve guide 103 can be coupled to or decoupled from the first side 35 of the valve body 33 via the coupler 39. For example, coupler 39 comprises a threaded portion of the valve stem 104, which engages complimentary threads located in a threaded hole or recess located on the first side 35 of the valve body 33.

As shown in FIG. 8, which is a schematic of a horizontal valve assembly 100 according to embodiments of this disclosure in a housing bore 66, in embodiments, the horizontal valve assembly 100 can further comprise a secondary valve guide 106 at a distal end 104" of the valve stem 104. The secondary valve guide 106 can comprise any suitable valve guide, such as, without limitation, a wagon wheel or ring-type valve guide. Ring or wheel portion 57 (also referred to as a secondary guide ring or wheel) can be coupled to the valve stem 104 toward an axially distal end 104" thereof (e.g., the axial end 104" of valve stem 104 distal valve body 33). The wheel portion 57 can be coupled to valve stem 104 proximate the distal end 104" thereof, for example, via a plurality of spokes or struts 59 extending radially from the valve stem 104 to wheel portion 57. Although described as a ring or wheel portion 57, in embodiments, secondary valve guide 106 can be a wagon wheel/ring guide", a "y-guide", a "double y-guide", a "lawn dart" guide, a "spring guide, or the like.

As shown in FIG. 4 and noted hereinabove, the horizontal valve assembly 100 can be disposed within a housing 65 having a valve seat 68 and a valve body contact surface 69. The valve seat 68 and valve body contact surface 69 may be an insert placed within the housing 65 or may be integral with (e.g., formed from, for example via machining) the housing 65. The horizontal valve assembly 100 comprises valve body 33, valve guide 103, and valve stem 104 connecting the valve body 33 to the valve guide 103. A valve spring 31 (e.g., a compression coil spring) can be present in housing bore 66 of the housing 65. The valve guide bore 50 has a horizontal central axis 17'. In a normally (e.g., biased) closed position as shown in FIG. 6, valve body contact surface 69 of valve seat 68 contacts a valve seat contact surface 37 of valve body 33, preventing or minimizing fluid flow through horizontal valve assembly 100. In an open configuration, valve body contact surface 69 of valve seat 68 does not contact valve seat contact surface 37 of valve body 33, thus allowing fluid flow through horizontal valve assembly 100. Pump Also disclosed herein is a pump fluid end 22 comprising a horizontal valve assembly 100 of this disclosure, and a pump 10 comprising the pump fluid end 22.

In embodiments, a pump fluid end 22 of this disclosure comprises: a reciprocating element 18 disposed at least partially within a reciprocating element bore 24 of the pump fluid end 22; a discharge valve assembly 72; and a suction valve assembly 56, wherein the discharge valve assembly 72 and/or the suction valve assembly 56 is a horizontal valve assembly 100 of this disclosure. As described in detail hereinabove, the horizontal valve assembly 100 comprises: valve body 33; valve guide 103; and valve stem 104. The valve guide 103 comprises: a valve guide body 40, wherein the valve guide body 40 is substantially cylindrical and has a valve guide bore 50 extending longitudinally therethrough along a valve guide bore central axis 17'. In an assembled configuration of the horizontal valve assembly 100, the valve stem 104 passes at least partially through the valve guide bore 50 and connects the valve body 33 to the valve guide 103. When the horizontal valve assembly 100 is initially positioned in a housing bore 66 of the housing 65 prior to use, the valve guide bore central axis 17' is vertically higher than a central axis 17 of the housing bore 66 of the housing 65. As described hereinabove, in embodiments, the valve guide bore central axis 17' can be vertically higher than the central axis 17' of the housing bore 66 by an offset distance $D_3$ of at least 0.03, 0.04, 0.05, 0.06, 0.07, 0.08, 0.09, or 0.1 inch (0.76, 1.02, 1.27, 1.52, 1.78, 2.03, or 2.29 mm).

As described above and depicted in FIG. 5 through FIG. 7, the valve guide 103 can further comprise first and second lower wings (first and second "skis" or "legs") 44A/44B, wherein each of the first and the second lower wings 44A/44B extends radially outward from the valve guide body 40 to a lower wing or ski outer surface 48A/48B at a distal end 47 thereof, such that the lower wing outer surface 48A/48B is a first radial distance $D_1$ from the valve guide bore central axis 17'; and/or an upper wing 48C extending radially outward from the valve guide body 40 to an upper wing outer surface 48C at a distal end 47 thereof, such that the upper wing outer surface 48C is a second radial distance $D_2$ from the valve guide bore central axis 17'. The first radial distance $D_1$ can be greater than an interior radius $R_2$ of the housing bore 66 in which the horizontal valve assembly 100 is positioned for use, such that, when the horizontal valve assembly 100 is initially positioned in the housing bore 66 of housing 65 prior to use, the valve guide bore central axis 17' is vertically higher than the central axis 17 of the housing bore 66 of the housing 65.

In embodiments, when the valve guide 103 is initially installed in the horizontal valve assembly 100, the first radial distance $D_1$ is greater than the interior radius $R_2$ of the housing bore 66 of the housing 65 by a vertical offset distance $D_3$ of at least 0.03, 0.04, 0.05, 0.06, 0.07, 0.08, 0.09, or 0.1 inch (0.76, 1.02, 1.27, 1.52, 1.78, 2.03, or 2.29 mm), such that, when the horizontal valve assembly 100 is initially positioned in the housing bore 66 of the housing 65 prior to use, and the lower wing outer surface 48 (e.g., 48A and/or 48B) of each of the first and second lower wings 44A/44B contacts an interior surface 65' of the housing bore 66 of the housing 65, the central axis 17' of the valve guide bore 66 is, along an axial length $L_{VG}$ of the valve guide 103, vertically higher than the central axis 17 of the housing bore 66 of the housing 65 by approximately the offset distance $D_3$.

Alternatively, the first radial distance $D_1$ can be substantially equal to an interior radius $R_2$ of the housing bore 66 in which the horizontal valve assembly 100 is positioned for use, such that, when the horizontal valve assembly 100 is initially positioned in the housing bore 66 of housing 65 prior to use, the valve guide bore central axis 17' is substantially coincident with the central axis 17 of the housing bore 66 of the housing 65.

In embodiments, the first radial distance $D_1$ can be greater than the second radial distance $D_2$, such that, when the horizontal valve assembly 100 is initially positioned in the housing bore 66 prior to initial use, a gap 105 is provided between the upper wing outer surface 48C and an interior surface 65' of the housing 65. The gap 105 can be greater than or equal to about 0.06, 0.07, 0.08, 0.09, 0.10, 0.2, 0.3, 0.4 inch (1.52, 1.78, 2.03, 2.29, 2.54, 5.087.62, or 10.16 mm) (e.g., from about 0.06 to 0.2 inch (1.52 to 5.08 mm). In embodiments, the housing bore 66 comprises the reciprocating element bore 24.

In embodiments, the pump fluid end 22 comprises the horizontal valve assembly 100 of this disclosure in an assembled configuration in which valve seat 68 is seated in valve seat housing 65, and valve body 33 is coupled to valve guide 103 via a valve stem 104. Valve spring 31 is positioned in bore 66 of valve seat housing 65.

In embodiments, a pump fluid end 22 of this disclosure comprises a suction valve assembly 56 and/or a discharge valve assembly 72 comprising the horizontal valve assembly 100 of this disclosure. In embodiments wherein the discharge valve assembly 72 comprises horizontal valve assembly 100, the valve seat 68 is a discharge valve seat, the valve body 33 is a discharge valve body, the valve spring 31 is a discharge valve spring, and the valve guide 103 is a discharge valve guide, and, when the discharge valve assembly 72 is in an assembled configuration, the discharge valve seat is seated in a discharge valve seat housing, the discharge valve body is coupled to the discharge valve guide via the valve stem, and the discharge valve spring is positioned in a bore of the discharge valve seat housing. In embodiments wherein the suction valve assembly 56 comprises horizontal valve assembly 100, the valve seat 68 is a suction valve seat, the valve body 33 is a suction valve body, and the valve guide is a suction valve guide, and, when the suction valve assembly 56 is in an assembled configuration in which the suction valve seat is seated in a suction valve seat housing, the suction valve body is coupled to the suction valve guide via the valve stem, and the suction valve spring is positioned in a bore of the suction valve seat housing.

A pump fluid end 22 of this disclosure can be a cross-bore pump fluid end 22 or a concentric bore pump fluid end 22. In embodiments, the pump fluid end 22 is a concentric bore pump fluid end, such as depicted in FIG. 2A. In some such embodiments, the discharge valve assembly 72 comprises a horizontal valve assembly 100 of this disclosure, and is positioned at least partially within the reciprocating element bore 24 and is coaxially aligned with suction valve assembly 56. In embodiments, the suction valve assembly 56 comprises a horizontal valve assembly 100 of this disclosure and a valve seat, and the reciprocating element 18 is at least partially hollow and has a front end 60 opposite a tail end 62 along a central axis 17 of the reciprocating element bore 24, and the suction valve assembly 56 is coupled with the front end of the reciprocating element 18. The reciprocating element 18 can be a plunger.

In embodiments, the pump fluid end 22 comprising a horizontal valve assembly 100 of this disclosure as suction valve assembly 56, is a cross-bore pump fluid end 22 such as a T-bore pump fluid end (e.g., of the type shown in FIG. 2B and described in detail herein) comprising a fluid end body 8 comprising a T-bore pump chamber 28, a cylindrical reciprocating element bore 24, partially defined by cylinder walls 26, in which a reciprocating element 18 can reciprocate during operation of a pump comprising the pump fluid end 22, the reciprocating element 18, and a pump power end 12 (FIG. 3), and a cylindrical T-bore 25 comprising a suction valve assembly 56 and a discharge valve assembly 72. In some such embodiments, the suction valve assembly 56 comprises a horizontal valve assembly 100 of this disclosure and a suction valve seat 68, and the reciprocating element 18 is at least partially hollow and has a front end 60 opposite a tail end 62 along a central axis 17 of the reciprocating element bore 24, and the suction valve assembly 56 is coupled with the front end of the reciprocating element 18. The reciprocating element 18 can be a plunger.

Also disclosed herein is a pump 10 comprising a pump fluid end 22 of this disclosure. The pump of this disclosure comprises a pump power end 12 (e.g., as described with reference to FIG. 3, hereinabove) and a pump fluid end 22. The pump power end 12 is operable to reciprocate the reciprocating element 18 within a reciprocating element bore 24 of the pump fluid end 22. As described hereinabove, the pump fluid end 22 comprises: the reciprocating element 18, a suction valve assembly 56, and a discharge valve assembly 72. Reciprocating element 18 is disposed at least partially within the reciprocating element bore 24, and has a front end 60 opposite a tail end 62 along a central axis 17 of the reciprocating element bore 24. According to this disclosure, the suction valve assembly 56 of pump 10 is coupled with the front end 60 of the reciprocating element 18. In embodiments, the pump is a positive displacement pump comprising a horizontal valve assembly 100 of this disclosure, and the valve guide 103 of the horizontal valve assembly 100 is a valve guide 103 as described hereinabove.

In embodiments, the pump fluid end 22 of the pump 10 is a concentric bore pump fluid end 22, such as depicted in the embodiment of FIG. 2A, and the discharge valve assembly 72 is positioned at least partially within the reciprocating element bore 24 and is coaxially aligned with the suction valve assembly 56. In embodiments, the pump fluid end 22 of the pump 10 is a tee-bore pump fluid end 22, such as depicted in the embodiment of FIG. 2B, and the discharge valve assembly 72 is positioned within a tee-bore 25 of the pump fluid end 22, wherein the tee-bore 25 is perpendicular to the reciprocating element bore 24.

A pump 10 of this disclosure can be a multiplex pump comprising a plurality of reciprocating assemblies (e.g., reciprocating elements 18, and a corresponding plurality of reciprocating element bores 24, suction valve assemblies 56, and discharge valve assemblies 72). The plurality can comprise any number such as, for example, 2, 3, 4, 5, 6, 7, or more. For example, in embodiments, pump 10 is a triplex pump, wherein the plurality comprises three. In alternative embodiments, pump 10 comprises a Quintuplex pump, wherein the plurality comprises five.

The pump 10 can be an oilfield services pump configured to pump a wellbore servicing fluid. Examples of wellbore servicing fluids suitable include, but are not limited to, cementitious fluids (e.g., cement slurries), drilling fluids or muds, spacer fluids, fracturing fluids or completion fluids, and gravel pack fluids, remedial fluids, perforating fluids, sealants, drilling fluids, completion fluids, diverter fluids, gelation fluids, polymeric fluids, aqueous fluids, oleaginous fluids, etc. The pump 10 can be used in oilfield and/or well servicing operations which include, but are not limited to, drilling operations, fracturing operations, perforating operations, fluid loss operations, primary cementing operations, secondary or remedial cementing operations, or any combination of operations thereof.

A pump with a horizontal guided valve assembly (hereinafter also referred to as a first valve assembly) that is not a horizontal valve assembly 100 of this disclosure can be serviced to become a pump of this disclosure (hereinafter also referred to as a serviced pump). The first valve assembly can be changed (e.g., replaced, retrofitted) into a horizontal valve assembly 100 of this disclosure (hereinafter also referred to as a second valve assembly). The second valve assembly can be a new valve assembly from the first valve assembly or a retrofit of the first valve assembly. For example, the first valve assembly can be a valve assembly that does not comprise a valve guide 103 as per this disclosure. The second valve assembly can be a horizontal valve assembly 100 of this disclosure comprising a valve guide 103 as described herein. The second valve assembly can be a retrofit of the first valve assembly. The retrofit can involve replacing a valve guide of the first valve assembly with a valve guide 103 as described herein, or adding to the first valve assembly (e.g., that does not comprise a valve guide) a valve guide 103 as described herein.

A method of servicing a pump can comprise: replacing/retrofitting a horizontal valve assembly thereof with/to a horizontal valve assembly 100 of this disclosure. The first valve assembly can be accessed from any of the one or more access ports of the pump 10, for instance, a front access port 30A and/or a top access port 30B.

The method can further comprise: removing a first horizontal guided valve assembly from the pump, wherein the first valve assembly comprises a valve body and a valve guide and wherein the valve guide of the first valve assembly has (had or was designed to initially have) a central axis coincident with central axis 17 of the housing bore 66; and installing a second horizontal guided valve assembly in the pump 10, wherein the second horizontal valve assembly is a horizontal valve assembly 100 of this disclosure comprising a valve body 33, a valve guide 103, and a valve stem 104, as described herein.

In embodiments, the second valve assembly can comprise any parts, as long as the second valve assembly has a valve guide bore central axis 17' that is moved vertically a distance (e.g., offset distance D3) in a direction above the central axis 17 of the housing bore 66 in comparison to the valve guide bore central axis of the valve guide of the first valve assembly. The method can further comprise: removing the first horizontal guided valve assembly from the pump 10; and installing the second horizontal guided valve assembly in the pump 10.

In embodiments, the first and/or the second valve assemblies can comprise any parts, as long as the second valve assembly has a valve guide bore central axis 17' that is moved vertically a distance (e.g., offset distance $D_3$) in a direction above the central axis 17 of the housing bore 66 in comparison to the valve guide bore central axis of the valve guide of the first valve assembly. The method can comprise: removing a first horizontal guided valve assembly from the pump 10, wherein the first valve assembly has guide bore central axis 17' substantially coincident with or vertically below a housing bore central axis 17; and installing a second horizontal guided valve assembly in the pump 10, wherein the second valve assembly has a valve guide bore central axis 17' that is moved vertically a distance (e.g., offset distance D3) in a direction above the central axis 17 of the housing bore 66 in comparison to the valve guide bore central axis of the valve guide of the first valve assembly.

In the methods disclosed hereinabove, the second valve assembly can be the first valve assembly adapted to further comprise the valve guide 103 as described herein with reference to FIGS. 4-8.

In the methods of this disclosure, the pump that is serviced can be an oil-field services positive displacement pump. In embodiments, the methods as disclosed hereinabove further comprise operating the serviced pump to place a wellbore servicing fluid in a wellbore. The method of using the pump in servicing a wellbore 224 will be described hereinbelow.

Figure 9:
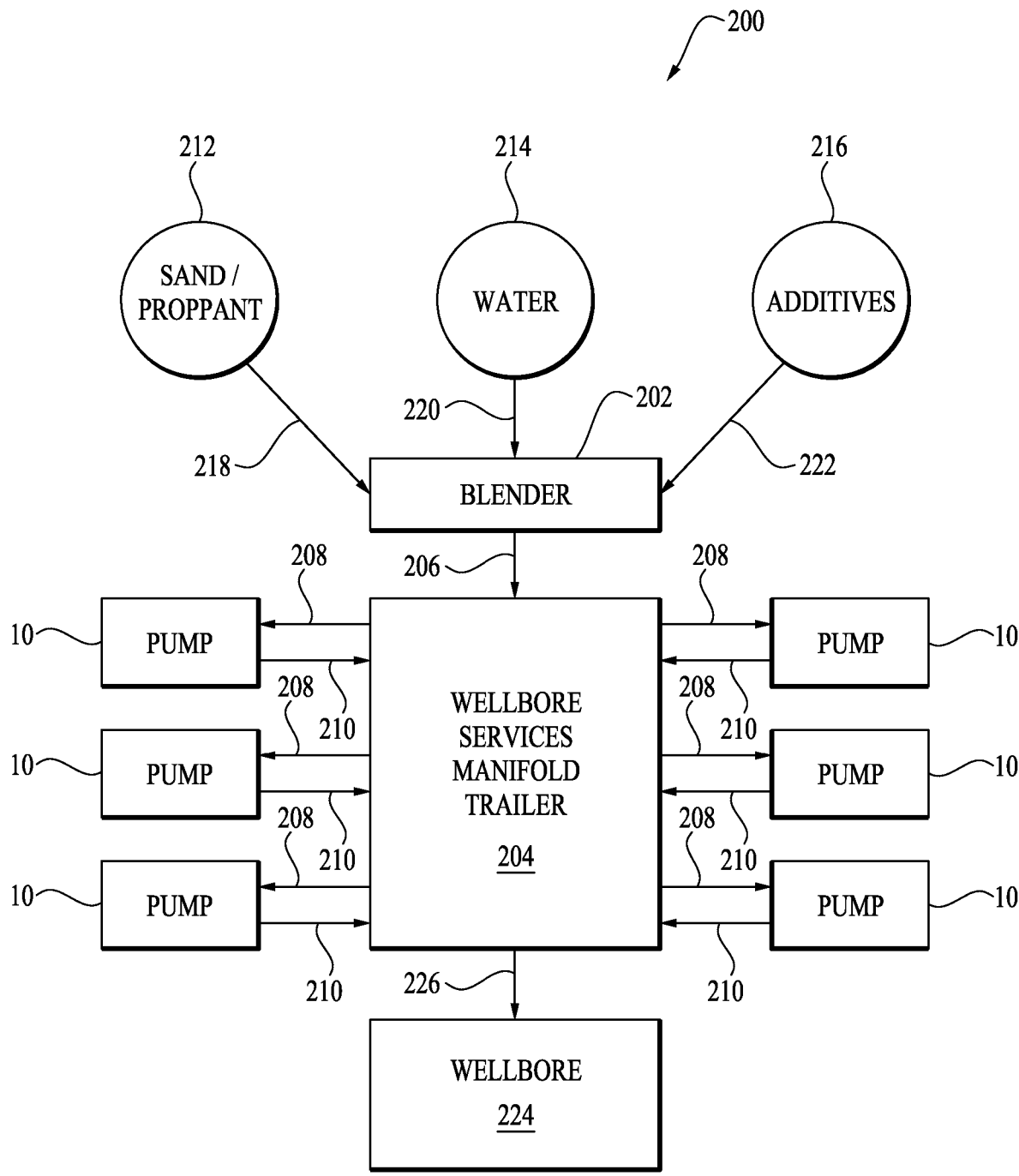
FIG. 9 is a schematic representation of an embodiment of a wellbore servicing system.

Disclosed herein are a method of servicing a wellbore and a wellbore servicing system 200 comprising a pump of this disclosure. An embodiment of a wellbore servicing system 200 and a method of servicing a wellbore via the wellbore servicing system 200 will now be described with reference to FIG. 9, which is a schematic representation of an embodiment of a wellbore servicing system 200, according to embodiments of this disclosure.

A method of servicing a wellbore 224 according to this disclosure comprises fluidly coupling a pump 10 of this disclosure to a source of a wellbore servicing fluid and to the wellbore, and communicating wellbore servicing fluid into the wellbore via the pump. The method can further comprise discontinuing the communicating of the wellbore servicing fluid into the wellbore via the pump, subjecting the pump to maintenance to provide a maintained pump, and communicating the or another wellbore servicing fluid into the wellbore via the maintained pump. Subjecting the pump to maintenance can comprise servicing the pump 10, as described hereinabove. Central axis 17' of the valve guide 103 can initially be a distance D3 above central axis 17 of the housing bore 66 of the housing 65 (e.g., which latter can be coincident with the central axis 17 of pump fluid end 22). During operation of a pump 10 of this disclosure, due to wear of lower leg outer surfaces 48 (e.g., first lower leg outer surface 48A and second lower leg outer surface 48B), central axis 17' of the valve guide 103 can more downward (e.g., vertical distance D3 between central axis 17' of valve guide bore 50 and central axis 17 of housing bore 66) can decrease, until central axis 17' of the valve guide 103 becomes substantially coincident with central axis 17 of housing bore 66. In embodiments, further operation of the pump 10 can result in additional wear on the outer surfaces 48 of the lower wings 44, such that central axis 17' of the valve guide 103 moves downward (e.g., vertical distance D3 between central axis 17' of valve guide bore 50 and central axis 17 of housing bore 66 can further decrease), until central axis 17' of the valve guide 103 is vertically below central axis 17 of housing bore 66. When the central axis 17' is vertically below the central axis 17 of the housing bore 66, the horizontal valve assembly can be repaired or replaced. In embodiments, the horizontal valve assembly 100 can be repaired (e.g., subjected to maintenance (e.g., to replace the valve guide 103 and/or one or more wings (e.g., one or more lower wings or skis 44A/44B) thereof) when central axis 17' of valve guide bore 50 is vertically below central axis 17 of housing bore 66 by a vertical distance of at least 0.03, 0.04, 0.05, 0.06, 0.07, 0.08, 0.09, or 0.1 inch (0.76, 1.02, 1.27, 1.52, 1.78, 2.03, or 2.29 mm).

In embodiments, a method of servicing a wellbore 224 comprises: fluidly coupling a pump 10 to a source of a wellbore servicing fluid and to the wellbore 224; and communicating wellbore servicing fluid into the wellbore 224 via the pump 10, wherein the pump 10 comprises a pump fluid end 22 and a pump power end 12; wherein the pump power end 22 is operable to reciprocate a reciprocating element 18 within the reciprocating element bore 24 of the pump fluid end 22, wherein the pump fluid end 22 comprises: the reciprocating element 18 disposed at least partially within the reciprocating element bore 24 of the pump fluid end 22; a discharge valve assembly 72; and a suction valve assembly 56, wherein the discharge valve assembly 72 and/or the suction valve assembly 56 comprises a valve seat 68 and a horizontal valve assembly 100 of this disclosure. As detailed further hereinabove, the horizontal valve assembly 100 comprises: a valve body 33; a valve guide 103; and a valve stem 104. As also detailed hereinabove, the valve guide 103 comprises: a valve guide body 40, wherein the valve guide body 40 is substantially cylindrical and has a valve guide bore 50 extending longitudinally therethrough along a valve guide bore central axis 17', and wherein, in an assembled configuration of the horizontal valve assembly 100, the valve stem 104 passes at least partially through the valve guide bore 50 and connects the valve body 33 to the valve guide 103. The valve guide 103 can further comprise: first and second lower wings (first and second "skis" or first and second "legs") 44A/44B, wherein each of the first and the second lower wings 44A/44B extends radially outward from the valve guide body 40 to a lower wing outer surface 48 (e.g., 48A/48B) at a distal end 47 thereof, such that the lower wing or ski outer surface 48A/48B is a first radial distance $D_1$ from the valve guide bore central axis 17'; and/or an upper wing 48C extending radially outward from the valve guide body 40 to an upper wing outer surface 48C at a distal end 47 thereof, such that the upper wing outer surface 48C is a second radial distance $D_2$ from the valve guide bore central axis 17'. The first radial distance $D_1$ can be greater than an interior radius $R_2$ of a housing bore 66 of a housing 65 (e.g., a hollow reciprocating element 18) in which the valve guide 103 is positioned for use, such that, when the horizontal valve assembly 100 is initially positioned in the housing bore 66 prior to use, the valve guide bore central axis 17' is vertically higher (e.g., by vertical offset distance $D_3$) than the central axis 17 of the housing bore 66.

The horizontal valve assembly 100 of this disclosure can be housed within a fluid end 22 of a positive displacement pump 10 and the method can further comprise operating the pump 10 to place a wellbore servicing fluid in a wellbore 224. The wellbore servicing fluid can comprise a fracturing fluid, a cementitious fluid, a remedial fluid, a perforating fluid, a sealant, a drilling fluid, a spacer fluid, a completion fluid, a gravel pack fluid, a diverter fluid, a gelation fluid, a polymeric fluid, an aqueous fluid, an oleaginous fluid, or a combination thereof.

In embodiments, a method of servicing a wellbore according to this disclosure can comprise: fluidly coupling the pump 10 of this disclosure to a source of a wellbore servicing fluid and to a wellbore 224, wherein the horizontal valve assembly 100 of the pump 10 is initially positioned in the housing bore 66 of the housing 65, such that the outer surface 48 (e.g., first lower wing or ski outer surface 48A and second lower wing or ski outer surface 48B) of each of the first lower wing or ski 44A and the second lower wing or ski 44B contacts an inside (e.g., guiding) surface 65' of the housing 65, wherein the upper wing 44C is substantially vertical, and wherein the outer surface 48C of the upper wing 44C is a distance or gap 105 from the inside surface 65' of the housing 65; and communicating wellbore servicing fluid into the wellbore via the pump. In such embodiments, the central axis of the valve guide bore 50 of the valve guide 103 of the horizontal valve assembly 100 can initially be vertically above (e.g., by offset distance $D_3$) or substantially coincident with the central axis 17 of the housing bore 66.

During the communicating of the wellbore servicing fluid into the wellbore 224 via the pump 10, due to wear of the inside surface 65' of the housing 65 and/or wear of the outer surface 48 (e.g., first lower wing or first ski outer surface 48A and/or second lower wing or second ski outer surface 48B) of the first lower wing or first ski 44A and/or the second lower wing or second ski 44B, the valve guide bore central axis 17' can move from the being initially vertically higher than the central axis 17 of the housing bore 66, to being substantially coincident with the central axis 17 of the housing bore 66, optionally to being vertically lower than the central axis 17 of the housing bore 66.

During the communicating of the wellbore servicing fluid into the wellbore 224 via the pump 10, the valve guide 103 (e.g., the first lower wing or ski 44A, the second lower wing or ski 44B, and/or the upper wing 44C thereof) can temporarily move vertically upward a distance up to the gap distance 105 to allow passage of debris or other particulate material under the first lower wing or ski 44A and/or the second lower wing or ski 44B, and, after passage of the debris or other particulate material under the first lower wing or ski 44A and/or the second lower wing or ski 44B, the valve guide 103 can move back downward (e.g., due to gravity), such that the outer surface 48 of each of the first lower wing or ski 44A and the second lower wing or ski 44B again contacts the inside (e.g., guiding) surface 65' of the housing 65, and the outer surface 48 of the upper wing 44C is at least the distance 105 (or farther due to wear of the outer surface 48 of the first lower wing or ski 44A, the second lower wing or ski 44B, or both) from the inside surface 65' of the housing 65. In this manner, the valve guide 103 can "jump" or "float" over the debris or other particulate material.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, sealants, drilling fluids, completion fluids, diverter fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 (e.g., pump(s) 10 and/or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. in embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gravel pack fluid, a diverter fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element 18 such as a plunger may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Those of ordinary skill in the art will readily appreciate various benefits that may be realized by the present disclosure. In embodiments, the valve guide 103 of this disclosure includes a plurality (e.g., 2, 3, etc.) feet (e.g., first lower wing 44A and second lower wing 44B) for resting along inside surface 65' of the housing 65 (e.g., along the inside diameter of a horizontal plunger bore 66) and supports the valve guide rod (e.g., valve stem 104). The support wings 44 are minimized to reduce flow obstruction. The center hole or bore 50 of the valve guide 103 can be on, or above center from the main bore 66 of the housing 65 (e.g., from the centerline 17' of plunger 18) to force the valve upwards to keep it from sagging. Traditional valve guide designs generally have radial clearance to prevent binding in the housing (e.g., plunger) bore 66, which causes the guide rod 104 to be below center. The herein disclosed valve guide 103 design enables both clearance for debris and maintenance of the guide rod/valve stem 104 either on or above center for longer duration until wear may lower the positioning of the valve stem 104 within the housing bore 66. Accordingly, the valve guide 103 can provide on-center or above-center guide rod holes and, thus, initial positioning of the guide rod 104 on-center or above-center of the housing bore 66 central axis 17.

The valve guide 103 of the horizontal valve assembly of this disclosure keeps the support rod (e.g., the valve stem 104) centered using an offset center hole (e.g., a valve guide bore 50 that has a central axis 17' that is initially offset by an offset distance $D_3$ from a central axis 17 of the housing 65 in which the valve guide is positioned for use). The valve guide 103 is close enough to the valve body 33 to optimize support of the valve body 33 and far enough away to not obstruct flow between the valve body 33 and the valve seat 68 when the valve is in the open configuration (e.g., which open configuration is depicted in FIG. 4).

This herein disclosed valve guide 103 design can minimize contact friction between the housing bore 66 (e.g., plunger bore 66) and the valve guide 103, while reducing the potential of binding when pumping particulate material slurry with a pump 10 comprising the horizontal valve assembly 100 of this disclosure.

Therefore, the present design can, in embodiments, increase valve life, lower total component cost, provide decreased maintenance spend, and/or decrease non-productive (i.e., down) time on location. In embodiments, the horizontal valve assembly is employed in a suction valve 56, and can serve to improves plunger (e.g., reciprocating element 18) life and suction valve 56 life, lower operating expense, extend operating time between maintenance events, and/or improve pump availability (e.g., thus potentially enabling a greater number of pumping hours per day).

ADDITIONAL DISCLOSURE

The following enumerated aspects of the present disclosure are provided as non-limiting examples.

In a first embodiment, a horizontal valve assembly comprises: a valve body; a valve guide; and a valve stem, wherein the valve guide comprises: a valve guide body, wherein the valve guide body is substantially cylindrical and has a valve guide bore extending longitudinally therethrough along a valve guide bore central axis. and wherein, in an assembled configuration of the horizontal valve assembly, the valve stem passes at least partially through the valve guide bore and connects the valve body to the valve guide; first and second lower wings ("skis" or "legs"), wherein each of the first and the second lower wings extends radially outward from the valve guide body to a lower wing outer surface at a distal end thereof, such that the lower wing outer surface is a first radial distance from the valve guide bore central axis; an upper wing extending radially outward from the valve guide body to an upper wing outer surface at a distal end thereof, such that the upper wing outer surface is a second radial distance from the valve guide bore central axis, wherein the first radial distance is greater than an interior radius of a housing bore of a housing in which the horizontal valve assembly is positioned for use, such that, when the horizontal valve assembly is initially positioned in the housing bore prior to use, the valve guide bore central axis is vertically higher than the central axis of the housing bore.

A second embodiment can include the horizontal valve assembly of the first embodiment, wherein the first radial distance is greater than the interior radius of the housing bore by an offset distance of at least 0.03, 0.04, 0.05, 0.06, 0.07, 0.08, 0.09, or 0.1 inch (0.76, 1.02, 1.27, 1.52, 1.78, 2.03, or 2.29 mm), such that when the horizontal valve assembly is initially positioned in the housing bore prior to use, and the lower wing outer surface of each of the first and second lower wings contacts an interior surface of the housing bore, the central axis of the valve guide bore is, along a length of the valve guide, vertically higher than the central axis of the housing bore by approximately the offset distance.

A third embodiment can include the horizontal valve assembly of the first or the second embodiment, wherein the first radial distance is greater than the second radial distance, such that, when the horizontal valve assembly is initially positioned in the housing bore prior to use, a gap 105 is provided between the upper wing outer surface and an interior surface of the housing bore of the housing.

A fourth embodiment can include the horizontal valve assembly of the third embodiment, wherein the gap is greater than or equal to about 0.4, 0.5, 0.6, 0.7, or 0.8 inch (10.2, 12.7, 15.2, 17.8, or 20.3 mm).

A fifth embodiment can include the horizontal valve assembly of any one of the first to fourth embodiments, wherein the valve guide body has an axial length $L_{VG}$ (e.g., parallel to valve guide bore central axis 17') and wherein the first lower wing, the second lower wing, and the upper wing extend radially outward along a first portion of the valve guide body, wherein the first portion extends axially from a first end of the valve guide body toward a second end of the valve guide body.

A sixth embodiment can include the horizontal valve assembly of any one of the first to fifth embodiments, further comprising one or more holes in the valve guide body, wherein the one or more holes are configured for affixing the valve guide body to the valve stem.

A seventh embodiment can include the horizontal valve assembly of the sixth embodiment, wherein the one or more holes are located in a second portion of the valve guide body, and extends from a second end of the valve guide body toward a first end of the valve guide body, wherein the second end is distal the valve body and opposite a first end of the valve guide body.

An eighth embodiment can include the horizontal valve assembly of any one of the first to seventh embodiments, wherein the valve guide body comprises walls having a thickness $T_1$ of greater than or equal to about 0.06 inch (1.52 mm).

A ninth embodiment can include the horizontal valve assembly of any one of the first to eighth embodiments, wherein the outer surface of upper wing has a rectangular cross section.

A tenth embodiment can include the horizontal valve assembly of the ninth embodiment, wherein the rectangular cross section (and the upper wing) has a width $W_{UW}$ (e.g., perpendicular to the valve guide bore central axis) in a range of from about in a range of from about 0.1, 0.15, or 0.2 inch (2.54, 3.81, or 5.08 mm) to about 0.3, 0.35, or 0.4 inch (7.62, 8.89, or 10.16 mm) and/or an axial length $L_{UW,A}$ in a range of from about 0.1, 0.5, 1, or 2 inches (from about 2.54, 12.7, 25.4, or 50.8 mm) to about 0.4, 0.5, 1, or 2 inch (10.16, 12.7, 25.4, or 50.8 mm) (e.g., from about 0.5 to 2 inch (12.7 to 50.8 mm).

An eleventh embodiment can include the horizontal valve assembly of any one of the first to tenth embodiments, wherein each wing selected from the first lower wing, the second lower wing, and the upper wing comprises a valve guide body proximate section and an extender section, wherein the valve guide body proximate section extends radially from a valve guide body end of the each wing to the extender section, wherein the valve guide body proximate section is flared circumferentially along valve guide body; and wherein the first lower wing and the second lower wing each further comprise an outer section, wherein the outer section extends radially from the extender section thereof to the outer surface thereof.

A twelfth embodiment can include the horizontal valve assembly of any one of the first to eleventh embodiments, wherein the outer surface of each of the first lower wing and the second lower wing extends an axial length $L_{LW,A}$ and is curved along an arc length S, which, when the horizontal valve assembly is positioned in the housing bore, extends along a portion of the inner circumference of the housing bore.

A thirteenth embodiment can include the horizontal valve assembly of the twelfth embodiment, wherein the portion of the inner circumference comprises an angle $\alpha_3$ of the inner circumference of the housing bore, wherein the angle $\alpha_3$ comprises from about 10, 20, or 30, to about 20, 30, or 40 degrees (e.g., from about 10 to about 40 degrees) of the inner circumference of the housing bore.

A fourteenth embodiment can include the horizontal valve assembly of the thirteenth embodiment, wherein the arc length S is equal to the interior radius of the housing bore $R_2$ times $\alpha_3$ (in radians).

In a fifteenth embodiment, a pump fluid end comprises: a reciprocating element disposed at least partially within a reciprocating element bore of the pump fluid end; a discharge valve assembly; and a suction valve assembly, wherein the discharge valve assembly and/or the suction valve assembly is a horizontal valve assembly according to any one of the first to fourteenth embodiments.

A sixteenth embodiment can include the pump fluid end of the fifteenth embodiment, wherein the pump fluid end is a concentric bore pump fluid end, wherein the discharge valve assembly is positioned at least partially within the reciprocating element bore and is coaxially aligned with the suction valve assembly.

A seventeenth embodiment can include the pump fluid end of the fifteenth or sixteenth embodiment, wherein the suction valve assembly comprises the horizontal valve assembly and a valve seat, and wherein the reciprocating element is at least partially hollow and has a front end opposite a tail end along a central axis of the reciprocating element bore, and wherein the suction valve assembly is coupled with the front end of the reciprocating element.

In a eighteenth embodiment, a pump comprises the pump fluid end of any one of the fifteenth to seventeenth embodiments.

In a nineteenth embodiment, a method of servicing a wellbore comprises: fluidly coupling a pump to a source of a wellbore servicing fluid and to the wellbore; and communicating wellbore servicing fluid into the wellbore via the pump, wherein the pump comprises a pump fluid end and a pump power end; wherein the pump power end is operable to reciprocate the reciprocating element within the reciprocating element bore of the pump fluid end, wherein the pump fluid end comprises: a reciprocating element disposed at least partially within a reciprocating element bore of the pump fluid end; a discharge valve assembly; and a suction valve assembly, wherein the discharge valve assembly and/ or the suction valve assembly comprises a valve seat and a horizontal valve assembly, wherein the horizontal valve assembly comprises: a valve body; a valve guide; and a valve stem, wherein the valve guide comprises: a valve guide body, wherein the valve guide body is substantially cylindrical and has a valve guide bore extending longitudinally therethrough along a valve guide bore central axis. and wherein, in an assembled configuration of the horizontal valve assembly, the valve stem passes at least partially through the valve guide bore and connects the valve body to the valve guide; first and second lower wings ("skis" or "legs"), wherein each of the first and the second lower wings extends radially outward from the valve guide body to a lower wing outer surface at a distal end thereof, such that the lower wing outer surface is a first radial distance from the valve guide bore central axis; an upper wing extending radially outward from the valve guide body to an upper wing outer surface at a distal end thereof, such that the upper wing outer surface is a second radial distance from the valve guide bore central axis, wherein the first radial distance is greater than an interior radius of a housing bore of a housing in which the horizontal valve assembly is positioned for use, such that, when the horizontal valve assembly is initially positioned in the housing bore prior to use, the valve guide bore central axis is vertically higher than the central axis of the housing bore.

A twentieth embodiment can include the method of the nineteenth embodiment, wherein the valve assembly is housed within a fluid end of a positive displacement pump and the method further comprises operating the pump to place a wellbore servicing fluid in a wellbore.

A twenty first embodiment can include the method of the nineteenth or twentieth embodiment, wherein the wellbore servicing fluid comprises a fracturing fluid, a cementitious fluid, a remedial fluid, a perforating fluid, a sealant, a drilling fluid, a spacer fluid, a completion fluid, a gravel pack fluid, a diverter fluid, a gelation fluid, a polymeric fluid, an aqueous fluid, an oleaginous fluid, or a combination thereof.

In a twenty second embodiment, a method of servicing a wellbore comprises: fluidly coupling the pump according to the eighteenth embodiment to a source of a wellbore servicing fluid and to the wellbore, wherein the horizontal valve assembly of any one of the first to fourteenth embodiments is initially positioned in the housing bore of the housing, such that the outer surface of each of the first lower wing and the second lower wing contacts an inside (e.g., guiding) surface of the housing, wherein the upper wing is substantially vertical, and wherein the outer surface of the upper wing is a distance from the inside surface of the housing; and communicating wellbore servicing fluid into the wellbore via the pump.

A twenty third embodiment can include the method of the twenty second embodiment, wherein, during the communicating of the wellbore servicing fluid into the wellbore via the pump, due to wear of the inside surface of the housing and/or wear of the outer surface of the first lower wing and/or the second lower wing, the valve guide bore central axis moves from the being initially vertically higher than the central axis of the housing bore, to being substantially coincident with the central axis of the housing bore, optionally to being vertically lower than the central axis of the housing bore.

A twenty fourth embodiment can include the method of any one of the twenty second to twenty third embodiments, wherein, during the communicating of the wellbore servicing fluid into the wellbore via the pump, the valve guide (e.g., the first lower wing, the second lower wing, and/or the upper wing thereof) moves vertically upward a distance up to the gap distance to allow passage of debris or other particulate material under the first lower wing and/or the second lower wing, and, after passage of the debris or other particulate material under the first lower wing and/or the second lower wing, the valve guide moves back downward (e.g., due to gravity), such that the outer surface of each of the first lower wing and the second lower wing again contacts the inside (e.g., guiding) surface of the housing, and the outer surface of the upper wing is at least the distance (or farther due to wear of the outer surface of the first wing, the second wing, or both) from the inside surface of the housing.

In a twenty fifth embodiment, a pump fluid end comprises: a reciprocating element disposed at least partially within a reciprocating element bore of the pump fluid end; a discharge valve assembly; and a suction valve assembly, wherein the discharge valve assembly and/or the suction valve assembly is a horizontal valve assembly, wherein the horizontal valve assembly comprises: a valve body; a valve guide; and a valve stem, wherein the valve guide comprises: a valve guide body, wherein the valve guide body is substantially cylindrical and has a valve guide bore extending longitudinally therethrough along a valve guide bore central axis. and wherein, in an assembled configuration of the horizontal valve assembly, the valve stem passes at least partially through the valve guide bore and connects the valve body to the valve guide; wherein, when the horizontal valve assembly is initially positioned in a housing bore prior to use, the valve guide bore central axis is vertically higher than a central axis of the housing bore.

A twenty sixth embodiment can include the pump fluid end of the twenty fifth embodiment, wherein the valve guide bore central axis is vertically higher than the central axis of the housing bore by at least 0.03, 0.04, 0.05, 0.06, 0.07, 0.08, 0.09, or 0.1 inch (0.76, 1.02, 1.27, 1.52, 1.78, 2.03, or 2.29 mm).

A twenty seventh embodiment can include the pump fluid end of the twenty sixth or twenty seventh embodiment, wherein the valve guide further comprises first and second lower wings ("skis" or "legs"), wherein each of the first and the second lower wings extends radially outward from the valve guide body to a lower wing outer surface at a distal end thereof, such that the lower wing outer surface is a first radial distance from the valve guide bore central axis; an upper wing extending radially outward from the valve guide body to an upper wing outer surface at a distal end thereof, such that the upper wing outer surface is a second radial distance from the valve guide bore central axis, wherein the first radial distance is greater than an interior radius of the housing bore in which the horizontal valve assembly is positioned for use, such that, when the horizontal valve assembly is initially positioned in the housing bore prior to use, the valve guide bore central axis is vertically higher than the central axis of the housing bore.

A twenty eighth embodiment can include the pump fluid end of the twenty seventh embodiment, wherein the first radial distance is greater than the second radial distance, such that, when the horizontal valve assembly is initially positioned in the housing bore prior to use, a gap 105 is provided between the upper wing outer surface and an interior surface of the housing bore.

A twenty ninth embodiment can include the pump fluid end of the twenty eighth embodiment, wherein the gap is greater than or equal to about 0.06, 0.07, 0.08, 0.09, 0.10, 0.2, 0.3, 0.4 inch (1.52, 1.78, 2.03, 2.29, 2.54, 5.08, 7.62, or 10.16 mm) (e.g., from about 0.06 to 0.2 or 0.3 inch (1.52 to 5.08 or 7.62 mm).

A thirtieth embodiment can include the pump fluid end of any one of the twenty fifth to twenty ninth embodiments, wherein the housing bore comprises the reciprocating element bore.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A horizontal valve assembly comprising:
   a valve body;
   a valve guide; and
   a valve stem,
      wherein the valve guide comprises:
      a valve guide body, wherein the valve guide body is substantially cylindrical and has a valve guide bore extending longitudinally therethrough along a valve guide bore central axis, and wherein, in an assembled configuration of the horizontal valve assembly, the valve stem passes at least partially through the valve guide bore and connects the valve body to the valve guide;
      first and second lower wings, wherein each of the first and the second lower wings extends radially outward from the valve guide body to a lower wing outer surface at a distal end thereof, such that the lower wing outer surface is a first radial distance from the valve guide bore central axis;
      an upper wing extending radially outward from the valve guide body to an upper wing outer surface at a distal end thereof, such that the upper wing outer surface is a second radial distance from the valve guide bore central axis,
   wherein the first radial distance is greater than an interior radius of a housing bore of a housing in which the horizontal valve assembly is positioned for use, such that, when the horizontal valve assembly is initially positioned in the housing bore prior to use, the valve guide bore central axis is vertically higher than the central axis of the housing bore.

2. The horizontal valve assembly of claim 1, wherein the first radial distance is greater than the interior radius of the housing bore by an offset distance of at least 0.03 inch (0.76 mm), such that when the horizontal valve assembly is initially positioned in the housing bore prior to use, and the lower wing outer surface of each of the first and second lower wings contacts an interior surface of the housing bore, the central axis of the valve guide bore is, along a length of the valve guide, vertically higher than the central axis of the housing bore by approximately the offset distance.

3. The horizontal valve assembly of claim 1, wherein the first radial distance is greater than the second radial distance, such that, when the horizontal valve assembly is initially positioned in the housing bore prior to use, a gap is provided between the upper wing outer surface and an interior surface of the housing bore of the housing.

4. The horizontal valve assembly of claim 1, wherein the valve guide body has an axial length $L_{VG}$ and wherein the first lower wing, the second lower wing, and the upper wing extend radially outward along a first portion of the valve guide body, wherein the first portion extends axially from a first end of the valve guide body toward a second end of the valve guide body.

5. The horizontal valve assembly of claim 1, further comprising one or more holes in the valve guide body, wherein the one or more holes are configured for affixing the valve guide body to the valve stem.

6. The horizontal valve assembly of claim 5, wherein the one or more holes are located in a second portion of the valve guide body, and extends from a second end of the valve guide body toward a first end of the valve guide body, wherein the second end is distal the valve body and opposite a first end of the valve guide body.

7. The horizontal valve assembly of claim 1, wherein the outer surface of upper wing has a rectangular cross section.

8. The horizontal valve guide assembly of claim 1, wherein each wing selected from the first lower wing, the second lower wing, and the upper wing comprises a valve guide body proximate section and an extender section, wherein the valve guide body proximate section extends radially from a valve guide body end of the each wing to the extender section, wherein the valve guide body proximate section is flared circumferentially along valve guide body; and wherein the first lower wing and the second lower wing each further comprise an outer section, wherein the outer section extends radially from the extender section thereof to the outer surface thereof.

9. The horizontal valve assembly of claim 1, wherein the outer surface of each of the first lower wing and the second lower wing extends an axial length and is curved along an arc length, which, when the horizontal valve assembly is positioned in the housing bore, extends along a portion of the inner circumference of the housing bore.

10. A pump fluid end comprising: a reciprocating element disposed at least partially within a reciprocating element bore of the pump fluid end; a discharge valve assembly; and a suction valve assembly, wherein the discharge valve assembly, the suction valve assembly, or both comprise a horizontal valve assembly according to claim 1.

11. A pump comprising the pump fluid end of claim 10.

12. A method of servicing a wellbore, the method comprising:
   fluidly coupling the pump according to claim 11 to a source of a wellbore servicing fluid and to the wellbore, wherein the horizontal valve assembly is initially positioned in the housing bore of the housing, such that the outer surface of each of the first lower wing and the second lower wing contacts an inside surface of the housing, wherein the upper wing is substantially vertical, and wherein the outer surface of the upper wing is a distance from the inside surface of the housing; and
   communicating wellbore servicing fluid into the wellbore via the pump.

13. The method of claim 12, wherein, during the communicating of the wellbore servicing fluid into the wellbore via the pump, due to wear of the inside surface of the housing; wear of the outer surface of the first lower wing, the second lower wing, or both; or a combination thereof, the valve guide bore central axis moves from the being initially vertically higher than the central axis of the housing bore, to being substantially coincident with the central axis of the housing bore, optionally to being vertically lower than the central axis of the housing bore.

14. The method of claim 12, wherein, during the communicating of the wellbore servicing fluid into the wellbore via the pump, the valve guide moves vertically upward a distance up to the gap distance to allow passage of debris or other particulate material under the first lower wing, the second lower wing, or both, and, after passage of the debris or other particulate material under the first lower wing, the second lower wing, or both, the valve guide moves back downward, such that the outer surface of each of the first lower wing and the second lower wing again contacts the inside surface of the housing, and the outer surface of the upper wing is at least the distance from the inside surface of the housing.

15. A method of servicing a wellbore, the method comprising:
  fluidly coupling a pump to a source of a wellbore servicing fluid and to the wellbore; and
  communicating wellbore servicing fluid into the wellbore via the pump,
    wherein the pump comprises a pump fluid end and a pump power end;
    wherein the pump power end is operable to reciprocate the reciprocating element within the reciprocating element bore of the pump fluid end,
    wherein the pump fluid end comprises:
      a reciprocating element disposed at least partially within a reciprocating element bore of the pump fluid end;
      a discharge valve assembly; and
      a suction valve assembly,
        wherein the discharge valve assembly, the suction valve assembly, or both comprises a valve seat and a horizontal valve assembly, wherein the horizontal valve assembly comprises:
          a valve body;
          a valve guide; and
          a valve stem,
            wherein the valve guide comprises:
              a valve guide body, wherein the valve guide body is substantially cylindrical and has a valve guide bore extending longitudinally therethrough along a valve guide bore central axis, and wherein, in an assembled configuration of the horizontal valve assembly, the valve stem passes at least partially through the valve guide bore and connects the valve body to the valve guide;
              first and second lower wings, wherein each of the first and the second lower wings extends radially outward from the valve guide body to a lower wing outer surface at a distal end thereof, such that the lower wing outer surface is a first radial distance from the valve guide bore central axis;
              an upper wing extending radially outward from the valve guide body to an upper wing outer surface at a distal end thereof, such that the upper wing outer surface is a second radial distance from the valve guide bore central axis,
            wherein the first radial distance is greater than an interior radius of a housing bore of a housing in which the horizontal valve assembly is positioned for use, such that, when the horizontal valve assembly is initially positioned in the housing bore prior to use, the valve guide bore central axis is vertically higher than the central axis of the housing bore.

16. The method of claim 15, wherein the valve assembly is housed within a fluid end of a positive displacement pump and the method further comprises operating the pump to place a wellbore servicing fluid in a wellbore.

* * * * *